(12) United States Patent
Yoon et al.

(10) Patent No.: US 11,006,795 B2
(45) Date of Patent: May 18, 2021

(54) ROBOT CLEANER

(71) Applicant: SAMSUNG ELECTRONICS CO., LTD., Suwon (KR)

(72) Inventors: Sang Sik Yoon, Suwon (KR); Byung Chan Kim, Yongin (KR); Byoung In Lee, Suwon (KR); Jun Hwa Lee, Suwon (KR); Jae Young Jung, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 15/704,839

(22) Filed: Sep. 14, 2017

(65) Prior Publication Data
US 2018/0000300 A1    Jan. 4, 2018

Related U.S. Application Data

(62) Division of application No. 13/652,802, filed on Oct. 16, 2012, now abandoned.

(30) Foreign Application Priority Data

Oct. 18, 2011  (KR) .................. 10-2011-0106678
Mar. 5, 2012   (KR) .................. 10-2012-0022469

(51) Int. Cl.
*A47L 9/04*    (2006.01)
*A47L 9/28*    (2006.01)
(Continued)

(52) U.S. Cl.
CPC ............. *A47L 9/04* (2013.01); *A47L 9/2847* (2013.01); *A47L 9/2852* (2013.01);
(Continued)

(58) Field of Classification Search
CPC ...... A47L 9/04; A47L 11/4072; A47L 9/2847; A47L 9/2852; A47L 2201/02;
(Continued)

(56) References Cited

U.S. PATENT DOCUMENTS 5,095,077 A    3/1992    Gardeski
5,199,996 A    4/1993    Jonas
(Continued)

FOREIGN PATENT DOCUMENTS

CN    2479913 Y    3/2002
CN    1575731 A    2/2005
(Continued)

OTHER PUBLICATIONS

Translation of JP 2005 006857. (Year: 2020).*
(Continued)

*Primary Examiner* — Alexander Markoff
(74) *Attorney, Agent, or Firm* — Staas & Halsey LLP

(57) ABSTRACT

A robot cleaner includes a body to travel on a floor; an obstacle sensing unit to sense an obstacle approaching the body; an auxiliary cleaning unit pivotably mounted to a bottom of the body, to be extendable and retractable; and a control unit to control extension or retraction of the auxiliary cleaning unit based on a pivot angle formed by the auxiliary cleaning unit with respect to a travel direction of the body when the obstacle is sensed.

6 Claims, 24 Drawing Sheets

(51) Int. Cl.
    *G05D 1/02* (2020.01)
    *A47L 11/40* (2006.01)
(52) U.S. Cl.
    CPC ........ *A47L 11/4072* (2013.01); *G05D 1/0225* (2013.01); *G05D 1/0242* (2013.01); *G05D 1/0255* (2013.01); *A47L 2201/02* (2013.01); *A47L 2201/04* (2013.01); *G05D 2201/0203* (2013.01)
(58) Field of Classification Search
    CPC .................. A47L 2201/04; G05D 1/0225; G05D 1/0242; G05D 1/0255; G05D 2201/0203
    See application file for complete search history.

(56) References Cited

U.S. PATENT DOCUMENTS

| | | | | |
|---|---|---|---|---|
| 5,309,592 | A * | 5/1994 | Hiratsuka | A47L 11/4011 15/319 |
| 5,720,077 | A * | 2/1998 | Nakamura | A47L 11/4061 15/319 |
| 5,995,884 | A | 11/1999 | Allen | |
| 6,370,453 | B2 * | 4/2002 | Sommer | A47L 5/30 134/18 |
| 6,496,754 | B2 | 12/2002 | Song | |
| 6,597,143 | B2 | 7/2003 | Song | |
| 6,601,265 | B1 * | 8/2003 | Burlington | A47L 5/28 15/319 |
| 7,332,890 | B2 | 2/2008 | Cohen et al. | |
| 7,444,214 | B2 | 10/2008 | Cho | |
| 8,869,342 | B2 * | 10/2014 | Yoon | A47L 11/24 15/319 |
| 9,078,552 | B2 * | 7/2015 | Han | A47L 11/24 |
| 9,173,539 | B2 | 11/2015 | Yoon | |
| 9,854,954 | B2 * | 1/2018 | Han | A47L 11/40 |
| 2001/0004719 | A1 * | 6/2001 | Sommer | A47L 5/30 701/23 |
| 2002/0060542 | A1 | 5/2002 | Song | |
| 2002/0091466 | A1 | 7/2002 | Song | |
| 2006/0010638 | A1 | 1/2006 | Shimizu et al. | |
| 2007/0273864 | A1 | 11/2007 | Cho | |
| 2009/0218478 | A1 | 9/2009 | Kim | |
| 2013/0086760 | A1 * | 4/2013 | Han | A47L 11/4058 15/49.1 |
| 2013/0098401 | A1 | 4/2013 | Yoon | |
| 2013/0098402 | A1 | 4/2013 | Yoon | |

FOREIGN PATENT DOCUMENTS

| | | | |
|---|---|---|---|
| CN | 101276223 | | 10/2008 |
| EP | 0 424 229 | A1 | 4/1991 |
| GB | 2 225 221 | A | 5/1990 |
| JP | 7-47046 | | 2/1995 |
| JP | 7-155273 | | 6/1995 |
| JP | 2005-6857 | | 1/2005 |
| JP | 2005006857 | A * | 1/2005 |
| JP | 2011-45694 | | 3/2011 |
| KR | 10-2006-0050129 | | 5/2006 |
| KR | 10-2009-0033608 | | 4/2009 |

OTHER PUBLICATIONS

Korean Office Action dated Apr. 19, 2018 in Korean Patent Application No. 10-2012-0022469.
Extended European Search Report dated Mar. 19, 2018 in European Patent Application No. 12188917.4.
Korean Notice of Allowance dated Feb. 28, 2019 in Korean Patent Application No. 10-2012-0022469.
Chinese Office Action dated Apr. 19, 2017 in related Chinese Patent Application No. 201210397282.4.
Chinese Office Action dated Oct. 18, 2016 from Chinese Patent Application No. 2012103397282.4.
Chinese Office Action dated Feb. 14, 2016 in corresponding Chinese Application No. 20121039782.4.
U.S. Restriction Requirement dated Sep. 15, 2015 in related U.S. Appl. No. 13/652,802.
U.S. Notice of Noncompliant Amendment dated May 13, 2016 in related U.S. Appl. No. 13/652,802.
U.S. Office Action dated Dec. 24, 2015 in related U.S. Appl. No. 13/652,802.
U.S. Office Action Nov. 18, 2016 in related U.S. Appl. No. 13/652,802.
U.S. Office Action dated Mar. 9, 2017 in related U.S. Appl. No. 13/652,802.
U.S. Office Action dated Jul. 27, 2017 in related U.S. Appl. No. 13/652,802.
U.S. Appl. No. 13/652,802, filed Oct. 16, 2012, Sang Sik Yoon et al., Samsung Electronics Co., Ltd.
Partial European Search Report dated Dec. 12, 2017, in corresponding European Patent Application No. 12188917.4, 14 pgs.
European Communication dated Dec. 18, 2018 in European Patent Application No. 12188917.4.
Korean Office Action dated Oct. 31, 2018 in Korean Patent Application No. 10-2012-0022469.

* cited by examiner

ROBOT CLEANER

CROSS-REFERENCE TO RELATED APPLICATIONS

This application is a divisional of U.S. application Ser. No. 13/652,802 filed on Oct. 16, 2012, which claims the benefit of Korean Patent Application Nos. 10-2011-0106678 and 10-2012-0022469, respectively filed on Oct. 18, 2011 and Mar. 5, 2012 in the Korean Intellectual Property Office, the disclosures of which are incorporated herein by reference.

BACKGROUND

1. Field

Embodiments of the present disclosure relate to a robot cleaner and a control method for the same, which are capable of automatically cleaning a region to be cleaned by removing dust or the like from a floor of the cleaning region while traveling about the cleaning region.

2. Description of the Related Art

A robot cleaner is a device for automatically cleaning a region to be cleaned by sucking foreign matter such as dust from a floor of the cleaning region while autonomously traveling about the cleaning region without being operated by a user. Such a robot cleaner not only includes a main brush to remove dust or the like accumulated on a region beneath a body of the robot cleaner, but also includes an auxiliary cleaning tool to achieve an enhancement in cleaning performance in a region adjacent to a wall.

Such an auxiliary cleaning tool is outwardly protruded from an inside of the robot cleaner body, to sweep dust on a floor, in particular, dust in a region adjacent to a wall. Although such an auxiliary cleaning tool achieves an enhancement in cleaning performance in a region adjacent to a wall, there may be a problem in that the auxiliary cleaning tool has an increased possibility of striking the wall because it is outwardly protruded from the robot cleaner body. In a conventional robot cleaner, however, it may be impossible to prevent the auxiliary cleaning tool from striking an obstacle because protrusion of the auxiliary cleaning tool is not accurately controlled. For this reason, the auxiliary cleaning tool may interfere with travel of the robot cleaner. Consequently, it may be impossible to achieve efficient cleaning in a region adjacent to a wall.

SUMMARY

Therefore, it is an aspect of the present disclosure to provide a robot cleaner and a control method for the same, which are capable of adjusting an extension or retraction degree of an auxiliary cleaning unit when an obstacle is sensed.

Another aspect of the present disclosure is to provide a robot cleaner and a control method for the same, which are capable of controlling extension or retraction of an auxiliary cleaning unit in accordance with the shape of an obstacle.

Another aspect of the present disclosure is to provide a robot cleaner and a control method for the same, which are capable of controlling extension or retraction of an auxiliary cleaning unit in accordance with a travel direction of a body of the robot cleaner.

Another aspect of the present disclosure is to provide a robot cleaner and a control method for the same, which are capable of controlling extension or retraction of an auxiliary cleaning unit in accordance with a cleaning mode.

Additional aspects of the disclosure will be set forth in part in the description which follows and, in part, will be apparent from the description, or may be learned by practice of the disclosure.

In accordance with one aspect of the present disclosure, a robot cleaner includes a body to travel on a floor, an obstacle sensing unit to sense an obstacle approaching the body, an auxiliary cleaning unit mounted to a bottom of the body, to be extendable and retractable, and a control unit to control extension or retraction of the auxiliary cleaning unit when the obstacle is sensed, through adjustment of an extension or retraction degree of the auxiliary cleaning unit.

The auxiliary cleaning unit may be pivotably mounted to the bottom of the body. The control unit may adjust the extension or retraction of the auxiliary cleaning unit, based on a pivot angle formed by the auxiliary cleaning unit with respect to a travel direction of the body.

The control unit may adjust the extension or retraction degree of the auxiliary cleaning unit such that a distance between an outermost portion of the auxiliary cleaning unit and the obstacle is greater than a predetermined first critical value, but smaller than a predetermined second critical value.

The control unit may compare an output signal from the obstacle sensing unit according to a sensing direction of the obstacle sensing unit with a predetermined critical value, and adjusts the extension or retraction degree of the auxiliary cleaning unit, based on a result of the comparison.

The predetermined critical value may correspond to a distance from the body to an outermost portion of the auxiliary cleaning unit.

The control unit may adjust the extension or retraction degree of the auxiliary cleaning unit, based on an output signal from the obstacle sensing unit according to an extension direction of the auxiliary cleaning unit.

The control unit may adjust the extension or retraction degree of the auxiliary cleaning unit in proportion to the output signal.

In accordance with another aspect of the present disclosure, a robot cleaner includes a body to travel on a floor, an obstacle sensing unit to sense an obstacle approaching the body, at least one auxiliary cleaning unit mounted to a bottom of the body, to be extendable and retractable, and a control unit to control extension or retraction of the auxiliary cleaning unit when the obstacle is sensed, in accordance with a shape of the sensed obstacle.

The control unit may control the extension or retraction of the auxiliary cleaning unit when the obstacle has a flat wall shape such that the auxiliary cleaning unit is retracted after being maintained in an extended state for a predetermined time, or is extended after being maintained in a retracted state for a predetermined time.

The at least one auxiliary cleaning unit may include at least two auxiliary cleaning units mounted to the bottom of the body. When the obstacle is sensed only at a lateral side of the body, the control unit may only control extension or retraction of the auxiliary cleaning unit, which is disposed in a direction corresponding to the obstacle, among the at least two auxiliary cleaning units.

The at least one auxiliary cleaning unit may include at least two auxiliary cleaning units mounted to the bottom of the body. When the obstacle has a corner wall shape, the control unit may control extension or retraction of the auxiliary cleaning units, which are disposed at opposite sides of the body, among the at least two auxiliary cleaning units.

The control unit may control the extension or retraction of the auxiliary cleaning unit when the shape of the obstacle has a smaller size than a reference size.

In accordance with another aspect of the present disclosure, a robot cleaner includes a body to travel on a floor, an obstacle sensing unit to sense an obstacle approaching the body, at least one auxiliary cleaning unit mounted to a bottom of the body, to be extendable and retractable, and a control unit to control extension or retraction of the auxiliary cleaning unit when the obstacle is sensed, in accordance with a travel direction of the body.

The control unit may control the auxiliary cleaning unit to be retracted before and after rotation of the body or before and after backward movement of the body.

The at least one auxiliary cleaning unit may include at least two auxiliary cleaning units mounted to the bottom of the body around the body. The control unit may control extension or retraction of the auxiliary cleaning units in accordance with a rotation direction of the body such that a preceding one of the auxiliary cleaning units in the rotation direction of the body is retracted.

The control unit may control extension degrees of the auxiliary cleaning units in accordance with a rotation direction of the body such that a preceding one of the auxiliary cleaning units in a direction opposite to the rotation direction of the body has an increased extension degree.

The control unit may adjust a travel speed of the body or a rotation speed of an auxiliary cleaning tool coupled to the auxiliary cleaning unit when the body rotates.

In accordance with another aspect of the present disclosure, a robot cleaner includes a body to travel on a floor, an obstacle sensing unit to sense an obstacle approaching the body, an auxiliary cleaning unit mounted to a bottom of the body, to be extendable and retractable, and a control unit to control extension or retraction of the auxiliary cleaning unit when the obstacle is sensed, in accordance with a cleaning mode of the body.

The control unit may perform a control operation to prevent the auxiliary cleaning unit from extending when a cleaning operation is completed.

The control unit may perform a control operation to prevent the auxiliary cleaning unit from extending when the obstacle is determined to be a charger or an exhaust station during return of the body to the charger or the exhaust station.

The robot cleaner may further include a signal sensing unit to sense a discriminating signal for the charger or the exhaust station.

The discriminating signal may be an infrared signal, a radio frequency (RF) signal, or a magnetic field signal.

The control unit may perform a control operation to prevent the auxiliary cleaning unit from extending for a predetermined time when a cleaning operation starts in accordance with an automatic cleaning mode.

The control unit may perform a control operation to prevent the auxiliary cleaning unit from extending when the body performs a charging operation.

The control unit may perform a control operation to prevent the auxiliary cleaning unit from extending when the charging operation of the body is completed or when supply of electric power to the charger is stopped.

In accordance with still another aspect of the present disclosure, a control method for a robot cleaner includes driving a body of the robot cleaner such that the body travels on a floor, sensing an obstacle approaching the body, and controlling extension or retraction of an auxiliary cleaning unit mounted to a bottom of the body, to be extendable and retractable, through adjustment of an extension or retraction degree of the auxiliary cleaning unit.

The auxiliary cleaning unit may be pivotably mounted to the bottom of the body. The controlling the extension or retraction of the auxiliary cleaning unit may be executed based on a pivot angle formed by the auxiliary cleaning unit with respect to a travel direction of the body.

The controlling the extension or retraction of the auxiliary cleaning unit may be executed such that a distance between an outermost portion of the auxiliary cleaning unit and the obstacle is greater than a predetermined first critical value, but smaller than a predetermined second critical value.

The controlling the extension or retraction of the auxiliary cleaning unit may be executed based on a result of a comparison between an output signal from the obstacle sensing unit according to a sensing direction of the obstacle sensing unit and a predetermined critical value.

The predetermined critical value may correspond to a distance from the body to an outermost portion of the auxiliary cleaning unit.

The controlling the extension or retraction of the auxiliary cleaning unit may be executed, based on an output signal according to an obstacle sensing direction, along which the auxiliary cleaning unit extends.

The controlling the extension or retraction of the auxiliary cleaning unit may be executed in proportion to the output signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described with reference to the accompanying drawings.

Figure 1:
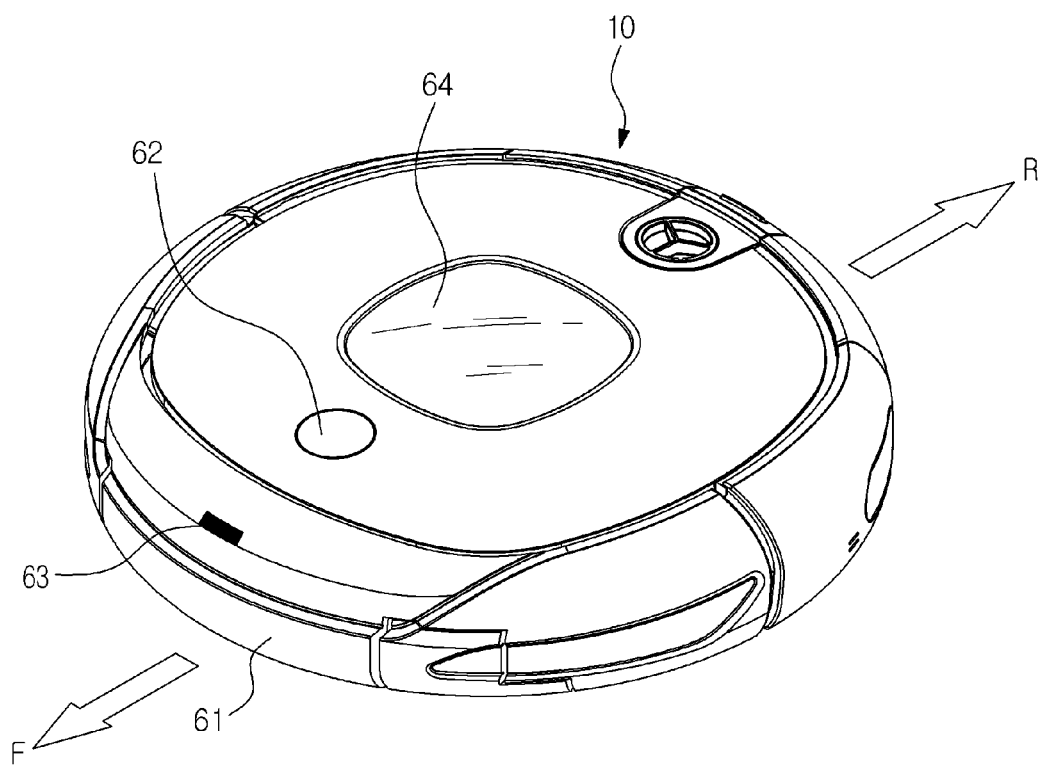
FIG. 1 is a view schematically illustrating an outer appearance of a robot cleaner according to an exemplary embodiment of the present disclosure.

FIG. 1 is a view schematically illustrating an outer appearance of a robot cleaner according to an exemplary embodiment of the present disclosure.

Referring to FIG. 1, the robot cleaner, which is designated by reference numeral "1", includes a body 10 to define an outer appearance of the robot cleaner 1.

Various sensors are mounted to the body 10, to sense an obstacle. The sensors may include a proximity sensor 61 and/or a vision sensor 62. For example, when the robot cleaner 1 travels in a random direction under the condition that there is no predetermined path along which the robot cleaner 1 travels, that is, in a cleaning system having no map, the robot cleaner 1 may travel about a cleaning region and sense an obstacle, using the proximity sensor 61. On the other hand, when the robot cleaner 1 travels along a predetermined path, that is, in a cleaning system requiring a map, the vision sensor 62 may be installed to receive position information of the robot cleaner 1, and thus to create a map. The sensors may be implemented in various manners.

A signal sensor 63 may also be mounted to the body 10, to receive a signal from a charger or an exhaust station.

A display unit 64 is coupled to the body 10, to display various states of the robot cleaner 1. For example, the display unit 64 may display a charged state of the battery, whether or not the dust collector 55 is full of dust, a cleaning mode of the robot cleaner 1, etc.

Configurations of the auxiliary cleaning units 21 and 22 will be described in more detail with reference to FIGS. 2 to 6.

Figure 2:
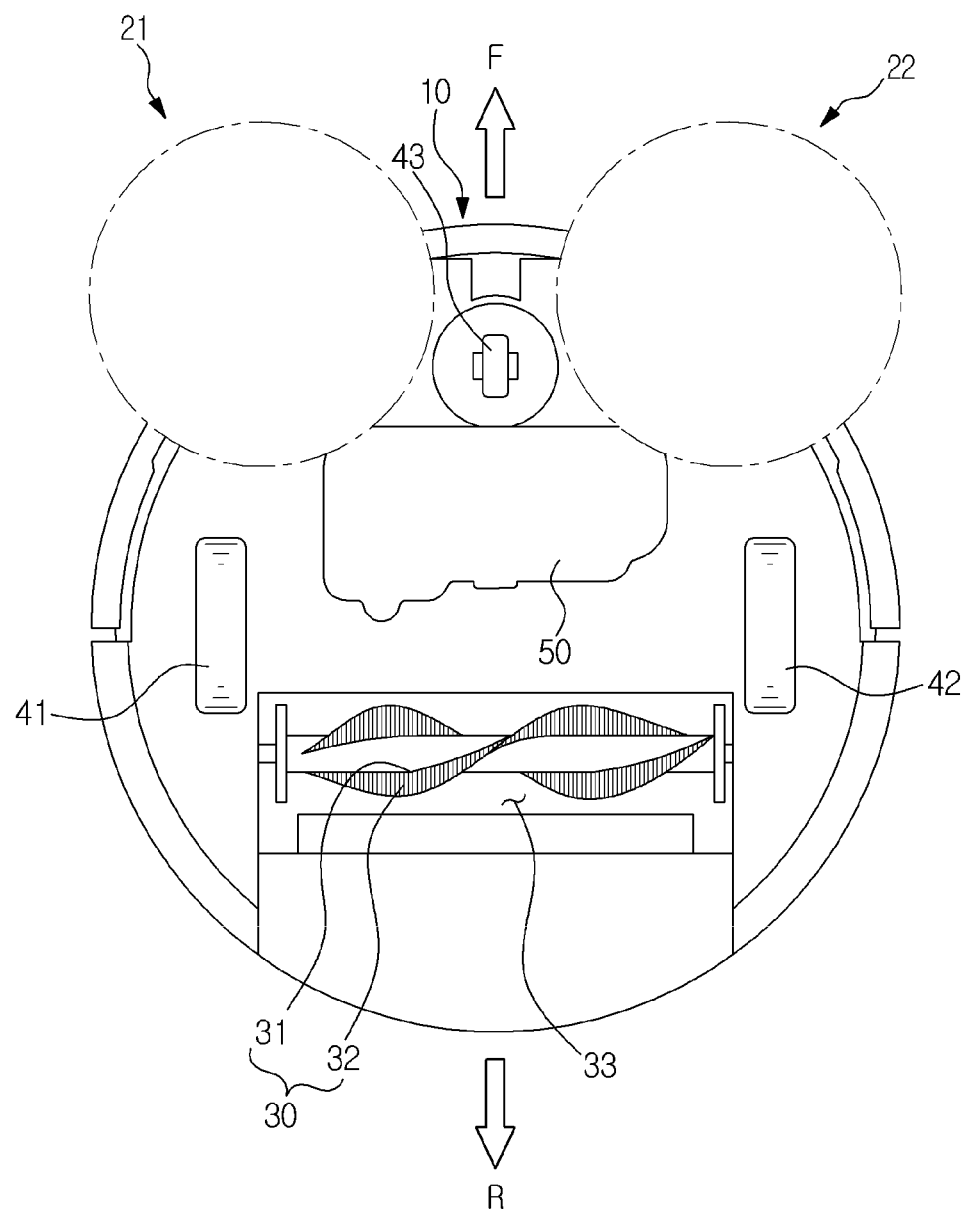
FIG. 2 is a bottom view schematically illustrating a configuration of the robot cleaner shown in FIG. 1.

FIG. 2 is a bottom view schematically illustrating a configuration of the robot cleaner shown in FIG. 1.

Referring to FIG. 2, the robot cleaner 1 includes a main brush unit 30, a power supply 50, drive wheels 41 and 42, a caster 43, and the auxiliary cleaning units 21 and 22.

The main brush unit 30 is mounted at an opening formed at a portion of the bottom of the body 10 biased from a central region of the body 10 in a rearward direction R. The main brush unit 30 sweeps dust accumulated on the floor, on which the body 10 is disposed, such that the swept dust is guided to a dust inlet 33. The opening of the bottom of the body 10, at which the main brush unit 30 is mounted, functions as the dust inlet 33.

The main brush unit 30 includes a roller 31, and a main brush 32 attached to an outer surface of the roller 31. As the roller 31 rotates, the main brush 32 sweeps dust accumulated on the floor such that the swept dust is guided to the dust inlet 33.

Although not shown in FIG. 2, a fan unit to generate suction force is provided within the dust inlet 33. The fan unit functions to move dust introduced into the dust inlet 33 to a dust collector.

The power supply 50 supplies drive power to drive the body 10. The power supply 50 includes a battery electrically connected to the body 10 and drivers to drive various elements mounted to the body 10, to supply drive power to the body 10 and drivers. The battery is constituted by a rechargeable secondary battery. When the body 10 is coupled to a charger or an exhaust station after completing a cleaning operation, the battery receives electric power from the charger or exhaust station, to be charged.

The drive wheels 41 and 42 are centrally arranged at opposite sides of the bottom of the body 10 in a symmetrical manner, respectively. The drive wheels 41 and 42 may perform movement operations including forward movement, backward movement, and rotation during cleaning.

The caster 43 is installed at a front edge portion of the bottom of the body 10 when viewed on the basis of a travel direction. The caster 43 enables the body 10 to keep a stable posture. The drive wheels 41 and 42, and caster 43 may be configured into a single assembly detachably mounted to the body 10.

Openings are formed at opposite sides of a front portion of the body 10 when viewed on the basis of a forward direction F, respectively. The auxiliary cleaning units 21 and 22 are installed to cover the openings, respectively.

Figure 3:
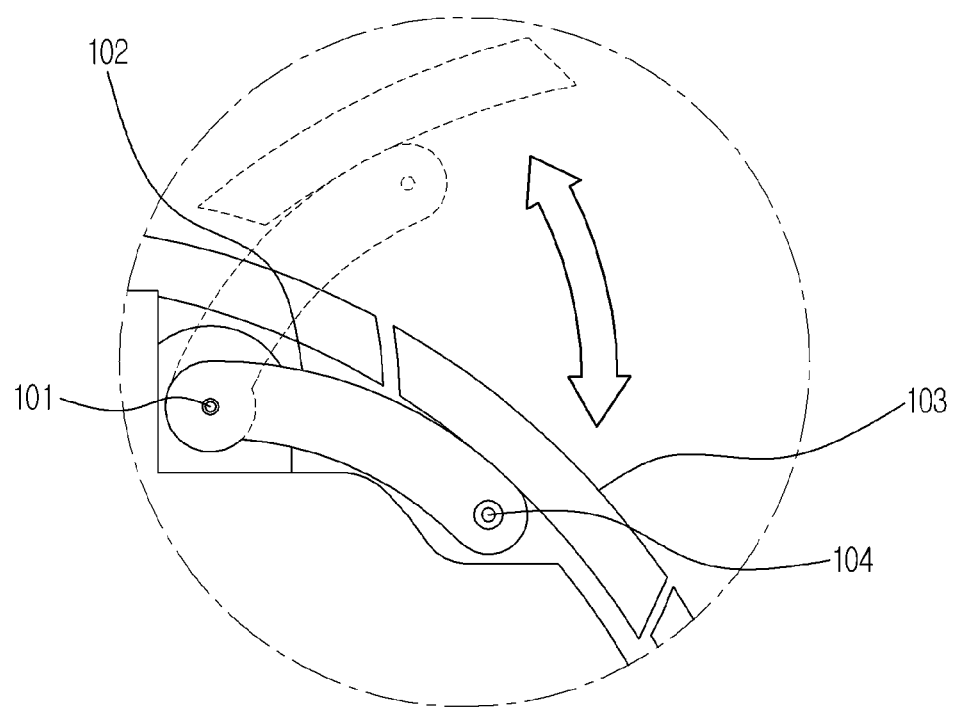
FIG. 3 is a view schematically illustrating a configuration for extending or retracting auxiliary cleaning units in accordance with an embodiment of the present disclosure.

FIG. 3 is a view schematically illustrating a configuration for extending or retracting the auxiliary cleaning units in accordance with an embodiment of the present disclosure.

Figure 5:
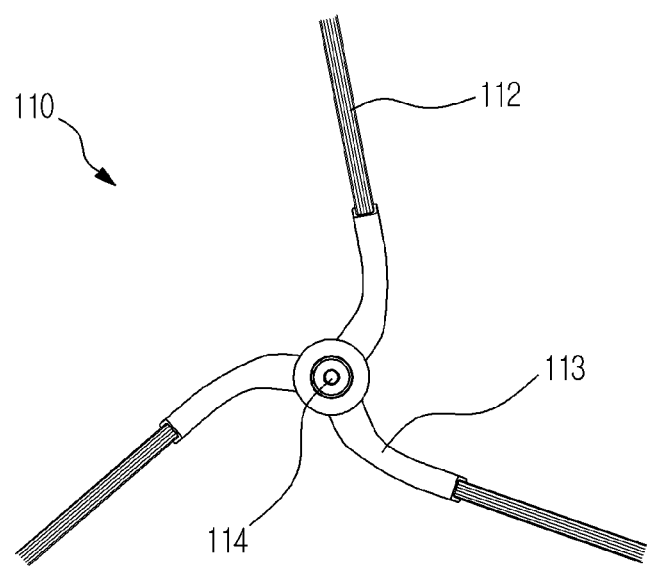
FIG. 5 is a view schematically illustrating a configuration of an auxiliary cleaning tool according to an exemplary embodiment of the present disclosure.
Figure 6:
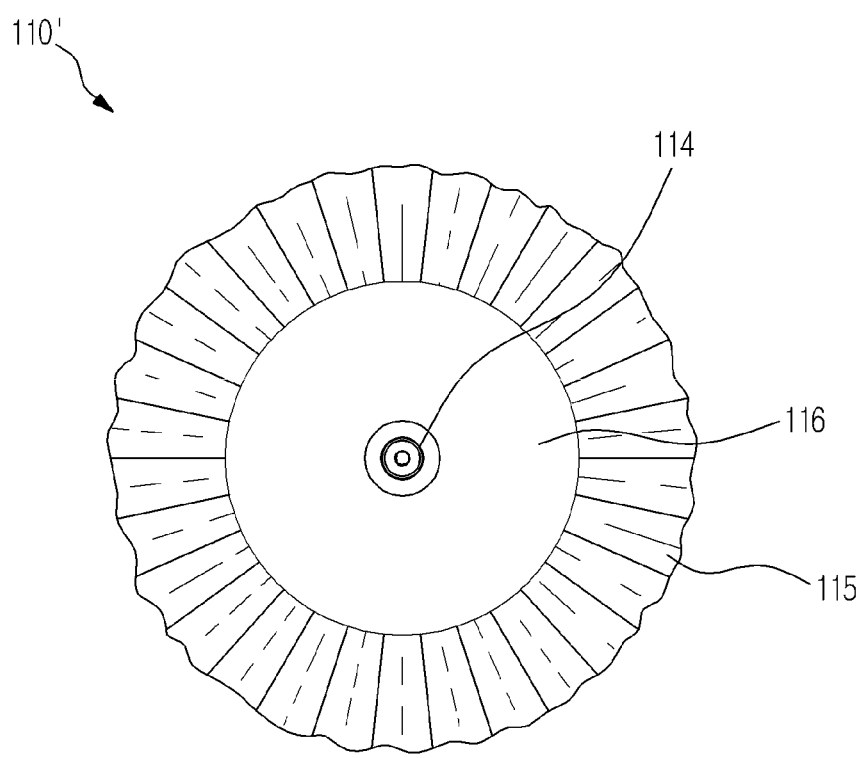
FIG. 6 is a view schematically illustrating a configuration of the auxiliary cleaning tool according to another embodiment of the present disclosure.

Referring to FIG. 3, each of the auxiliary cleaning units 21 and 22 includes a side arm 102, a periphery cover 103, and an auxiliary cleaning tool 110 (see FIGS. 5 and 6).

The side arm 102 is coupled to a front portion of the bottom of the body 10 at one side of the body 10. An arm motor (not shown) is received in the body 10 over the side arm 102, to drive the side arm 102. The arm motor is connected to a rotation shaft (not shown) via gears to transmit drive force to the side arm 102. The rotation shaft is mounted to a coupling groove 101 formed at one end of the side arm 102.

When the arm motor drives, the rotation shaft is rotated, thereby causing the side arm 102 to pivot about the coupling groove 101. In this case, the side arm 102 pivots outwardly of the body 10. In this state, the periphery cover 103 no longer covers the opening of the body 10. That is, the periphery cover 103 no longer forms the periphery of the body 10.

A coupling groove 104, to which the auxiliary cleaning tool 110 is coupled, is formed at the other end of the side arm 102. A rotation motor (not shown) is received in the body 10 over the coupling groove 104, to drive the auxiliary cleaning tool 110. The auxiliary cleaning tool 110 is rotated about the coupling groove 104 by drive force of the rotation motor.

Figure 4:
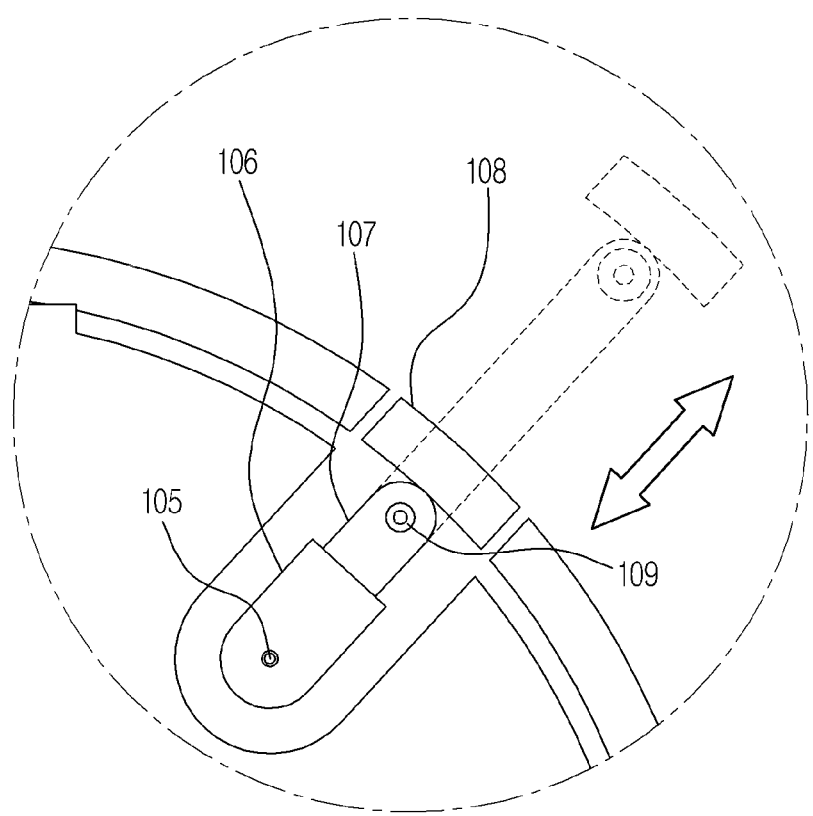
FIG. 4 is a view schematically illustrating a configuration for extending or retracting the auxiliary cleaning units in accordance with another embodiment of the present disclosure.

FIG. 4 is a view schematically illustrating a configuration for extending or retracting the auxiliary cleaning units in accordance with another embodiment of the present disclosure.

Referring to FIG. 4, each of the auxiliary cleaning units 21 and 22 includes a side arm 106, a periphery cover 108, and an auxiliary cleaning tool 110 (see FIGS. 5 and 6).

The side arm 106 is coupled to a front portion of the bottom of the body 10 at one side of the body 10 via a coupling groove 105. An extension arm 107 is received in the side arm 106 such that it is extendable outwardly of the side arm 106 in a sliding manner.

The extension arm 107 moves forward and rearward within the side arm 106 in a longitudinal direction of the side arm 106. To this end, a rail is formed within the side arm 106, and a guide (not shown), which is engaged with the rail, is formed at the extension arm 107. Accordingly, the extension arm 107 may slidably move along the rail in a state of being coupled to the rail. Another extension arm may be received in the extension arm 107 such that it is extendable outwardly of the extension arm 107 in a sliding manner. Meanwhile, movement of the another extension arm may be carried out in the same manner as described above. There is no limitation as to the number of extension arms.

An arm motor (not shown) is received in the body 10 over the side arm 106, to drive the extension arm 107. The arm motor transmits drive force to the extension arm 107 via gears. When the arm motor drives, the extension arm 107 slides outwardly of the side arm 106, to extend outwardly of the body 10. In this state, the periphery cover 108 no longer covers the opening of the body 10. That is, the periphery cover 108 no longer forms the periphery of the body 10.

A coupling groove 109, to which the auxiliary cleaning tool 110 is coupled, is formed at one end of the extension arm 107. A rotation motor (not shown) is received in the body over the coupling groove 109, to drive the auxiliary cleaning tool 110. The auxiliary cleaning tool 110 is rotated about the coupling groove 109 by drive force of the rotation motor.

FIG. 5 is a view schematically illustrating a configuration of the auxiliary cleaning tool according to an exemplary embodiment of the present disclosure.

Referring to FIG. 5, the auxiliary cleaning tool 110 includes brush arms 113 coupled to form a central common end such that they outwardly extend in a radial direction from the central common end while being spaced apart from one another in a circumferential direction. An auxiliary brush 112 is coupled to each brush arm 113. A rotation shaft 114 is formed at the central common end of the brush arms 113. The rotation shaft 114 extends to be coupled to the side arm 102 or extension arm 106 via the coupling groove 104 or 109. When the auxiliary cleaning tool 110 rotates, the auxiliary brush 112 sweeps dust accumulated on an area disposed adjacent to a wall toward the central region of the body 10 or disperses the dust.

FIG. 6 is a view schematically illustrating a configuration of the auxiliary cleaning tool according to another embodiment of the present disclosure.

Referring to FIG. 6, the auxiliary cleaning tool 110' includes a circular floorcloth holder 116. An auxiliary floorcloth 115 is fitted around the floorcloth holder 116 in a radial direction. A rotation shaft 114 is formed at a center of the floorcloth holder 116 such that it axially extends. The rotation shaft 114 receives drive force from a rotation motor, to rotate the auxiliary cleaning tool 110'. The rotation shaft 114 is coupled to the side arm 102 or extension arm 106 via the coupling groove 104 or 109. When the auxiliary cleaning tool 110' rotates, the auxiliary floorcloth 115 scrubs an area disposed adjacent to a wall.

Meanwhile, the auxiliary brush 112 may be made of various materials having elasticity. The auxiliary floorcloth 115 may be made of a fiber material or various materials other than the fiber material.

The robot cleaner 1 according to the illustrated embodiment of the present disclosure may clean even an area of the floor disposed adjacent to a wall or a corner area of the floor because the effective cleaning region of the robot cleaner 1 is extended by virtue of the auxiliary cleaning units 21 and 22 outwardly extendable from the body 10.

In the following description, it is assumed that extension of each auxiliary cleaning units 21 or 22 carried out during operation of the auxiliary cleaning units 21 or 22 include both pivotal movement of the side arm 102 outwardly of the body 10 in the embodiment of FIG. 3 and extension of the extension arm 106 outwardly of the body 10 in the embodiment of FIG. 4, except for the case in which the extension of each auxiliary cleaning unit 21 or 22 is separately described in conjunction with pivotal movement of the side arm 102 or the extension of the extension arm 106. Also, it is assumed that the auxiliary cleaning tool 110 cleans an area of the floor disposed adjacent to a wall or a corner area of the floor while rotating during cleaning operation of the robot cleaner 1.

Figure 7:
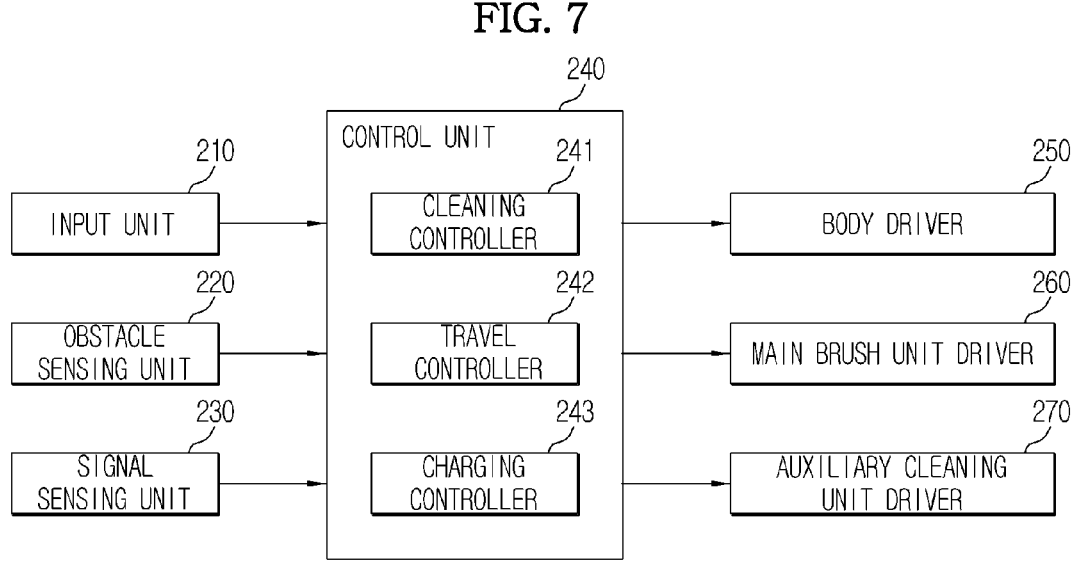
FIG. 7 is a block diagram schematically illustrating a control configuration of the robot cleaner according to an exemplary embodiment of the present disclosure.

FIG. 7 is a block diagram schematically illustrating a control configuration of the robot cleaner according to an exemplary embodiment of the present disclosure.

Referring to FIG. 7, the robot cleaner 1 includes an input unit 210, an obstacle sensing unit 220, a signal sensing unit 230, a control unit 240, a body driver 250, a main brush unit driver 260, and an auxiliary cleaning unit driver 270.

The input unit 210 receives a user's operation command from an operation panel provided at the body 10 or a remote controller. The user's operation command includes commands associated with travel, cleaning and charging operations of the robot cleaner 1. In particular, the user directly operates the remote controller, to input a command associated with, for example, protrusion of the auxiliary cleaning units 21 and 22.

The obstacle sensing unit 220 senses an obstacle approaching the body 10 during travel of the body 10. In more detail, the obstacle sensing unit 220 receives information as to obstacles from the proximity sensor 61 or vision sensor 62, and then senses an obstacle disposed around the body 10.

For example, the proximity sensor 61 may be implemented in the form of an ultrasonic sensor. In this case, the proximity sensor 61 may transmit an ultrasonic wave, and then receive an ultrasonic wave reflected from an obstacle, thereby sensing the obstacle. For this function, the proximity sensor 61 may have the form of a combination of at least one ultrasonic transmitter and at least one ultrasonic receiver installed around the periphery of the body 10. When the ultrasonic proximity sensor 61 further approaches an obstacle, it generates a signal having higher power because the intensity of an ultrasonic wave received by the ultrasonic proximity sensor 61 after being reflected from the obstacle increases. It may be possible to calculate the distance between the body 10 and the obstacle, based on the output signal from the proximity sensor 61.

Meanwhile, the vision sensor 62 acquires an image on the travel path of the body 10, and then senses an obstacle through processing of the acquired image. Practically, it may be possible to calculate the distance between the body 10 and the obstacle in the image processed by the vision sensor 62, based on three-dimensional coordinates.

The signal sensing unit 230 senses a discriminating signal transmitted from the charger or formed around the charger in accordance with operation of the signal sensor 63.

The body driver 250 drives the drive wheels 41 and 42, to move the robot cleaner 1. In accordance with a control command from a travel controller 242, the body driver 250 controls the travel direction and travel speed of the robot cleaner 1.

The main brush unit driver 260 drives the roller 31 in accordance with a control command from a cleaning controller 241. In accordance with rotation of the roller 31, the main brush 32 sweeps dust accumulated on the floor.

The auxiliary cleaning unit driver 270 drives the arm motor in accordance with a control command from the cleaning controller 241, to perform extension or retraction of each auxiliary cleaning unit 21 or 22. The auxiliary cleaning unit driver 270 also adjusts an extension or retraction degree of each auxiliary cleaning unit 21 or 22 by adjusting the number of rotations of the arm motor in accordance with the distance between the body 10 and the obstacle. The auxiliary cleaning unit driver 270 also performs rotation of the auxiliary cleaning tool 110 and adjusts the rotation speed of the auxiliary cleaning tool 110, to cause the auxiliary brush 112 (or the rotation speed of the auxiliary cleaning tool 110', to cause auxiliary floorcloth 115) to clean an area disposed adjacent to a wall.

The control unit 240 controls the overall operation of the robot cleaner 1 in accordance with a control program. The control unit 240 mainly includes the cleaning controller 241, which controls cleaning operation of the robot cleaner 1, the travel controller 242, which controls travel of the robot cleaner 1, and a charging controller 243 to control a charging operation of the robot cleaner 1.

The cleaning controller 241 not only controls operation of the main brush unit 30, but also determines whether each auxiliary cleaning unit 21 or 22 is to be extended or retracted. The cleaning controller 241 also controls an extension or retraction degree of each auxiliary cleaning unit 21 or 22. Also, the cleaning controller 241 determines an operation mode of the robot cleaner 1 among an automatic cleaning mode, a charging mode, a charging completion mode, a charging stop mode, etc., and controls extension or retraction of each auxiliary cleaning unit 21 or 22 in accordance with the determined operation mode.

The travel controller 242 controls forward movement, backward movement and rotation of the body 10. In more detail, the travel controller 242 controls rotation directions and speed of the drive wheels 41 and 42. When it is sensed that there is an obstacle on the travel path of the body 10, the travel controller 242 also determines whether the body 10 has to turn to the left or to the right or has to move backward.

The charging controller 243 controls the robot cleaner 1 to return to the charger or to the exhaust station when cleaning operation is completed, to cause the robot cleaner 1 to be charged. When a charging operation is carried out in a state in which the body 10 docks with the charger, the charging controller 243 determines a charged state of the robot cleaner 1. That is, the charging controller 243 may determine a completely charged state, a power shut-off state of the charger during charging operation, etc.

Hereinafter, methods for controlling extension and retraction of the auxiliary cleaning units of the above-described robot cleaner in accordance with embodiments of the present disclosure will be described.

Figure 8:
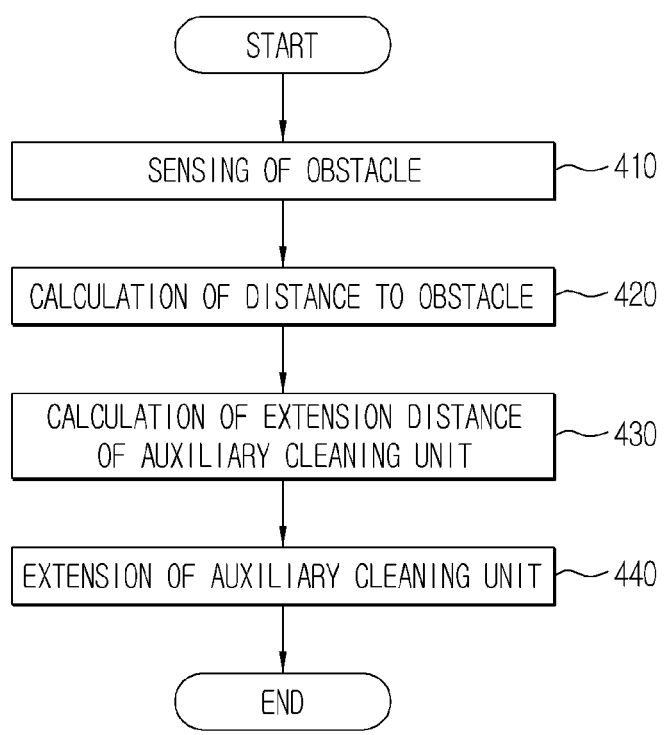
FIG. 8 is a flowchart schematically illustrating a method for controlling the robot cleaner in accordance with an embodiment of the present disclosure.
Figure 9:
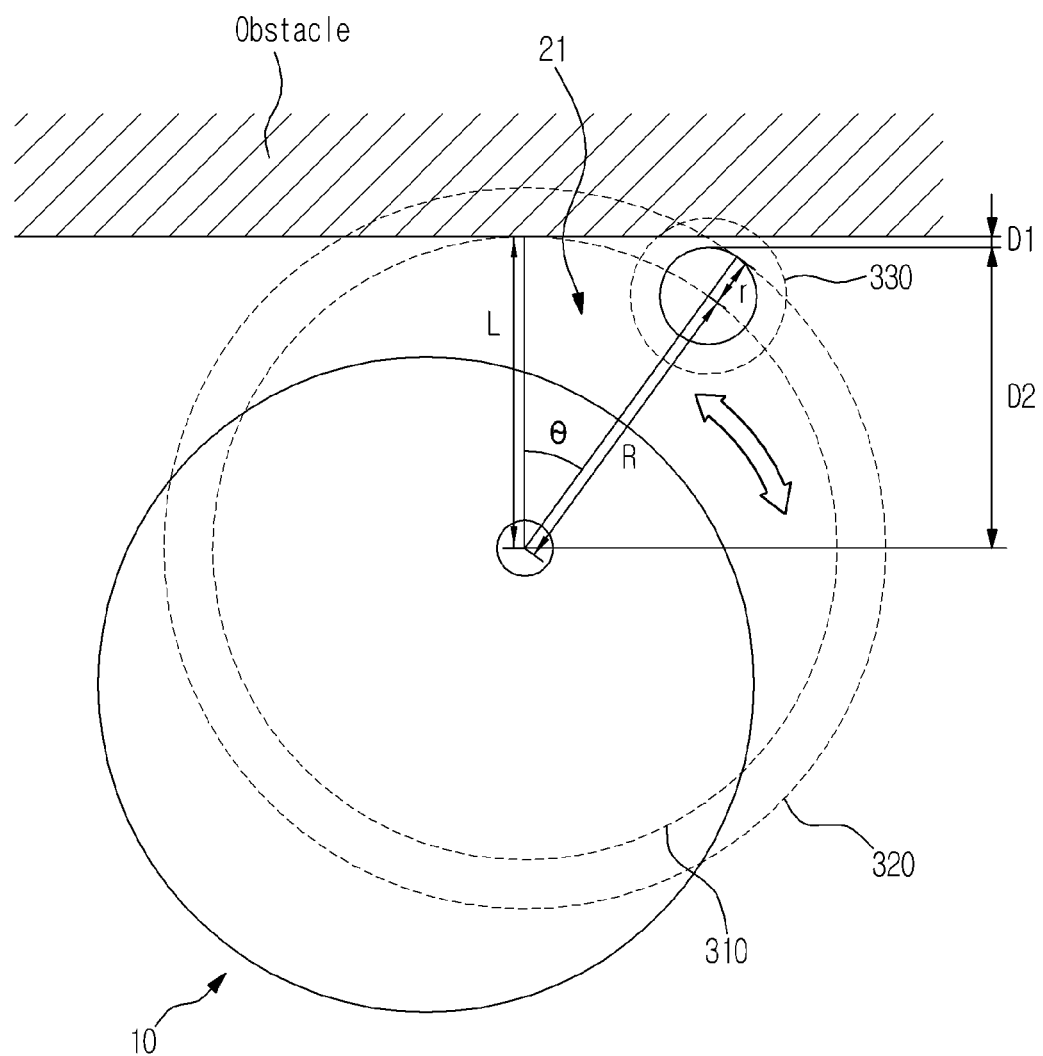
FIG. 9 is a view schematically illustrating operation of the robot cleaner according to the embodiment of FIG. 8.

FIG. 8 is a flowchart schematically illustrating a method for controlling the robot cleaner in accordance with an embodiment of the present disclosure. FIG. 9 is a view schematically illustrating operation of the robot cleaner according to the embodiment of FIG. 8.

Referring to FIGS. 8 and 9, the obstacle sensing unit 220 senses an obstacle approaching the body 10 (410). Thereafter, the cleaning controller 241 calculates the distance from the auxiliary cleaning unit 21 to the obstacle, namely, a distance L (420). In detail, the cleaning controller 241 may calculate the distance L from the rotation shaft of the auxiliary cleaning unit 21 to the obstacle, based on an output signal from the proximity sensor 61.

Subsequently, the cleaning controller 241 calculates a distance D2, by which the auxiliary cleaning unit 21 is extendable (430). The extendable distance D2 of the auxiliary cleaning unit 21 in a travel direction of the body 10 may be calculated, based on a rotation radius R of the side arm 102 and a rotation radius r of the auxiliary cleaning tool 110. Here, the rotation radius r of the auxiliary cleaning tool 110 represents the rotation radius of the brush arm 113 (or floorcloth holder 116 of auxiliary cleaning tool 110'), which does not have elasticity. In detail, the extendable distance D2 of the auxiliary cleaning unit 21 may be calculated through the following Expression:

$$D2 = R*\cos\theta + r \quad \text{Expression}$$

In the Expression, "θ" represents an angle formed by the side arm 102 with respect to the travel direction of the body 10. The auxiliary cleaning unit 21 may extend by a distance determined based on the angle θ while crossing a rotation path 310 of the side arm 102 and a rotation path 320 of the auxiliary cleaning tool 110.

Also, the extendable distance D2 of the auxiliary cleaning unit 21 to prevent the outermost portion of the auxiliary cleaning unit 21 from striking the obstacle is calculated. Here, the outermost portion of the auxiliary cleaning unit 21 represents an outermost peripheral portion of the rotating brush arm 113 (or floorcloth holder 116 of auxiliary cleaning tool 110') in the travel direction of the body 10. Accordingly, the auxiliary brush 112, which is made of an elastic material (or the auxiliary floorcloth 115, which is made of a fiber material) may perform cleaning in contact with an area disposed adjacent to a wall while rotating along a rotation path 330.

Thereafter, the cleaning controller 241 adjusts the extension distance of the auxiliary cleaning unit 21, and then controls the auxiliary cleaning unit 21 to extend by the adjusted extension distance (440). In this case, the extension distance of the auxiliary cleaning unit 231 is associated with the pivot angle of the side arm 102. The pivot angle of the side arm 102 is associated with the angle θ.

The cleaning controller 241 adjusts the pivot angle of the side arm 102 and, as such, the distance D1 between the outermost portion of the auxiliary cleaning unit 21 and the obstacle is adjusted. The distance D1 may be calculated by a difference between the distance L from the rotation shaft of the auxiliary cleaning unit 21 to the obstacle and the extension distance of the auxiliary cleaning unit 21, that is, the distance D2. The pivot angle of the auxiliary cleaning unit 21 may be adjusted such that the distance D1 between the outermost portion of the auxiliary cleaning unit 21 and the obstacle is greater than a predetermined first critical value, but smaller than a predetermined second critical value.

Figure 10:
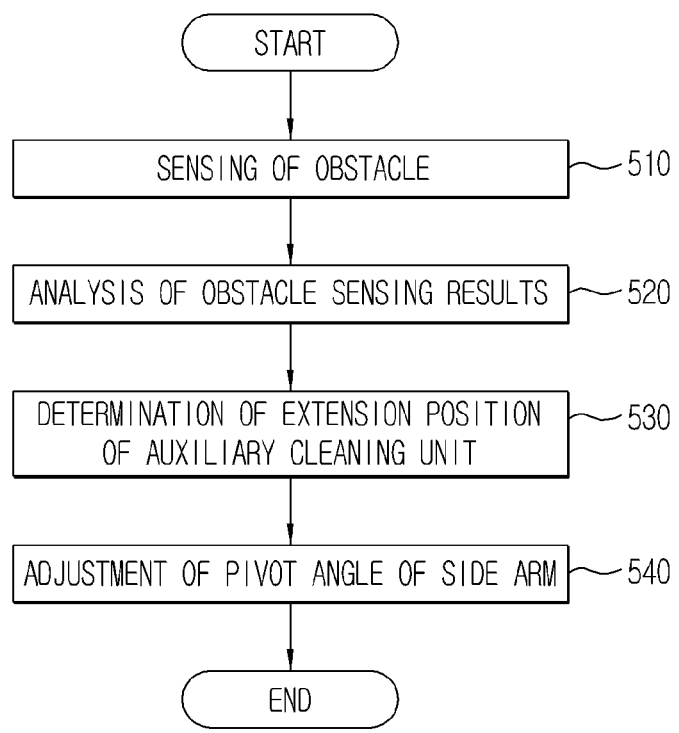
FIG. 10 is a flowchart schematically illustrating a method for controlling the robot cleaner in accordance with another embodiment of the present disclosure.
Figure 11:
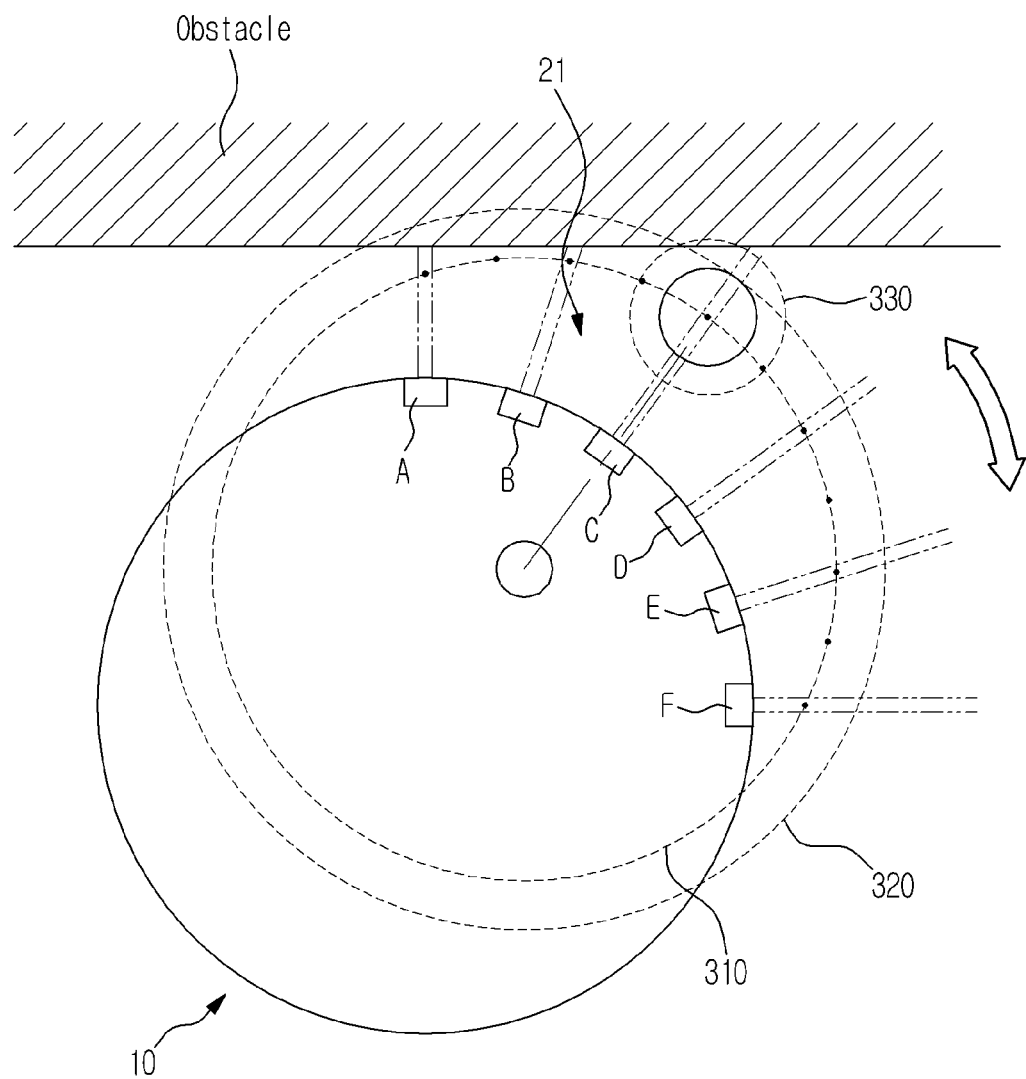
FIG. 11 is a view schematically illustrating operation of the robot cleaner according to the embodiment of FIG. 10.

FIG. 10 is a flowchart schematically illustrating a method for controlling the robot cleaner in accordance with another embodiment of the present disclosure. FIG. 11 is a view schematically illustrating operation of the robot cleaner according to the embodiment of FIG. 10. For convenience of description, this method will be described in conjunction with the embodiment of FIG. 3.

Referring to FIGS. 10 and 11, the obstacle sensing unit 220 senses an obstacle approaching the body 10 (510). At least one proximity sensor 61 is installed at the periphery of the body 10. The proximity sensor 61 senses an obstacle in a sensing direction thereof. In the illustrated case, a plurality of proximity sensors 61 is installed.

Figure 12:
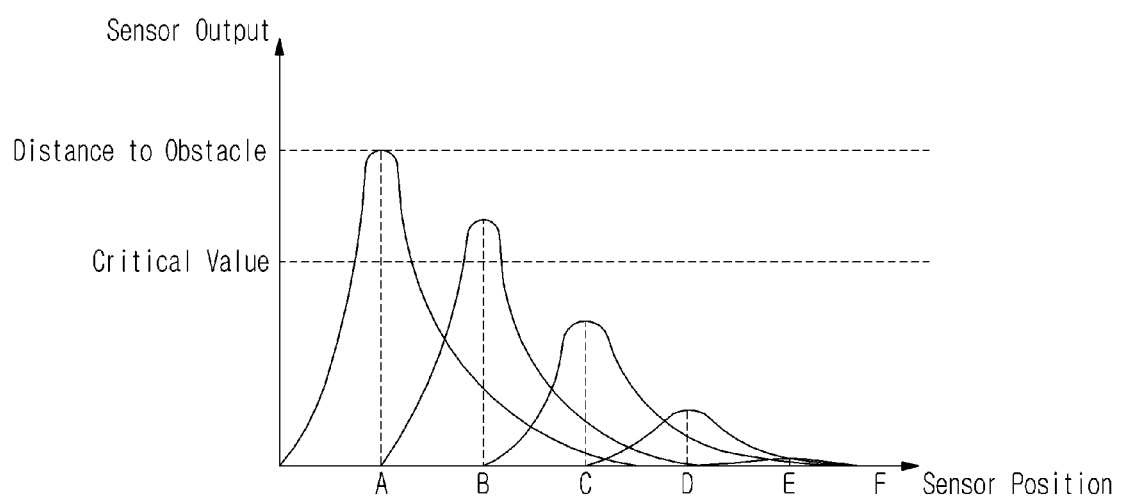
FIG. 12 is a graph schematically depicting obstacle sensing results of the robot cleaner according to the embodiment of FIG. 10.

Thereafter, the cleaning controller 241 analyzes results of obstacle sensing in accordance with positions of the proximity sensors 61 (520). Through analysis of the obstacle sensing results, it may be seen that output signals from the proximity sensors 61 exhibit different intensities in accordance with different sensing directions of the proximity sensors 61, as shown in FIG. 12. For example, when an obstacle is disposed in the travel direction of the body 10, output signals from the proximity sensors 61 exhibit higher intensities in the arrangement order of the proximity sensors 61 nearer to the front of the body 10. In the illustrated case, it may be possible to calculate the distance to the obstacle, based on the output signal from the proximity sensor 61 disposed at a sensor position A.

The cleaning controller 241 analyzes whether the output signal from each proximity sensor 61 is higher or lower than a predetermined critical value. Here, the critical value corresponds to the distance from the body 10 to the outermost portion of the auxiliary cleaning unit 21 in the travel direction of the body 10.

Subsequently, the cleaning controller 241 determines an extension position of the auxiliary cleaning unit 21, based on the results of analysis (530). The auxiliary cleaning unit 21 may extend to the extension position while crossing the rotation path 310 of the side arm 102 and the rotation path 320 of the auxiliary cleaning tool 110. The extension position of the auxiliary cleaning unit 21 corresponds to a position on the rotation path 310 of the side arm 102

When the output signal from the proximity sensor 61 is higher than the predetermined critical value, the cleaning controller 241 may determine that, in association with the position of the proximity sensor 61, there is an insufficient space to allow the auxiliary cleaning unit 21 to extend. In this case, from among the proximity sensors 61, each of which outputs a signal lower than the critical value, one proximity sensor 61 outputting a signal having highest intensity is selected. After determining the position of the selected proximity sensor 61, the cleaning controller 241 determines an extension position of the auxiliary cleaning unit 21 on the rotation path 310 of the side arm 102, based on the determined position of the proximity sensor 61.

On the other hand, when the output signal from the proximity sensor 61 is lower than the predetermined critical value, the cleaning controller 241 may determine that, in association with the position of the proximity sensor 61, there is a sufficient space to allow the auxiliary cleaning unit 21 to extend. In this case, the cleaning controller 241 determines the position of the proximity sensor 61, and then determines an extension position of the auxiliary cleaning unit 21 on the rotation path 310 of the side arm 102, based on the determined position of the proximity sensor 61.

Alternatively, it may be possible to determine an extension position of the auxiliary cleaning unit 21 on the rotation path 310 of the side arm 102, based on an intermediate position between the position of the proximity sensor 61 outputting a highest-intensity signal and the position of the proximity sensor 61 outputting a second higher-intensity signal.

Thereafter, the cleaning controller 241 adjusts a pivot angle of the side arm 102, based on the determined extension position, to cause the auxiliary cleaning unit 21 to extend to the determined extension position (540).

Figure 13:
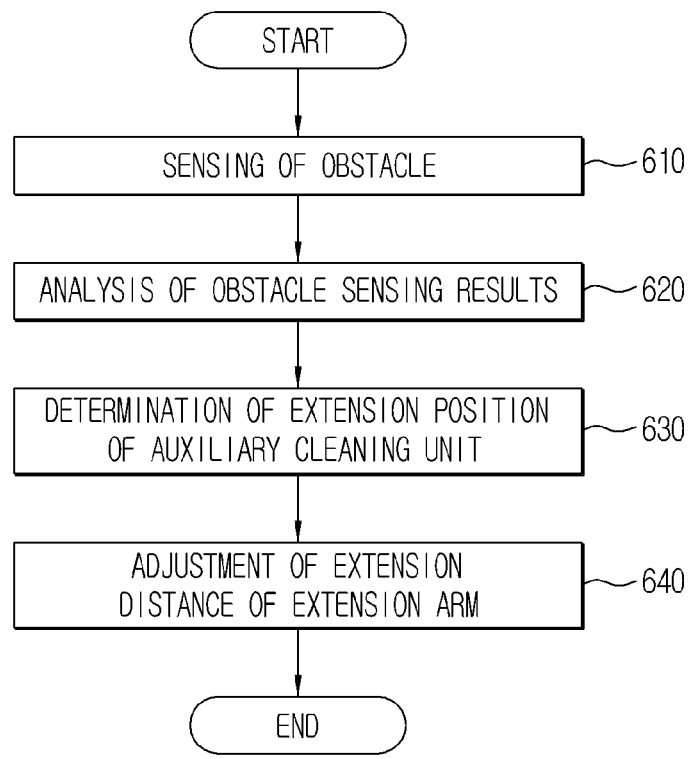
FIG. 13 is a flowchart schematically illustrating a method for controlling the robot cleaner in accordance with another embodiment of the present disclosure.
Figure 14:
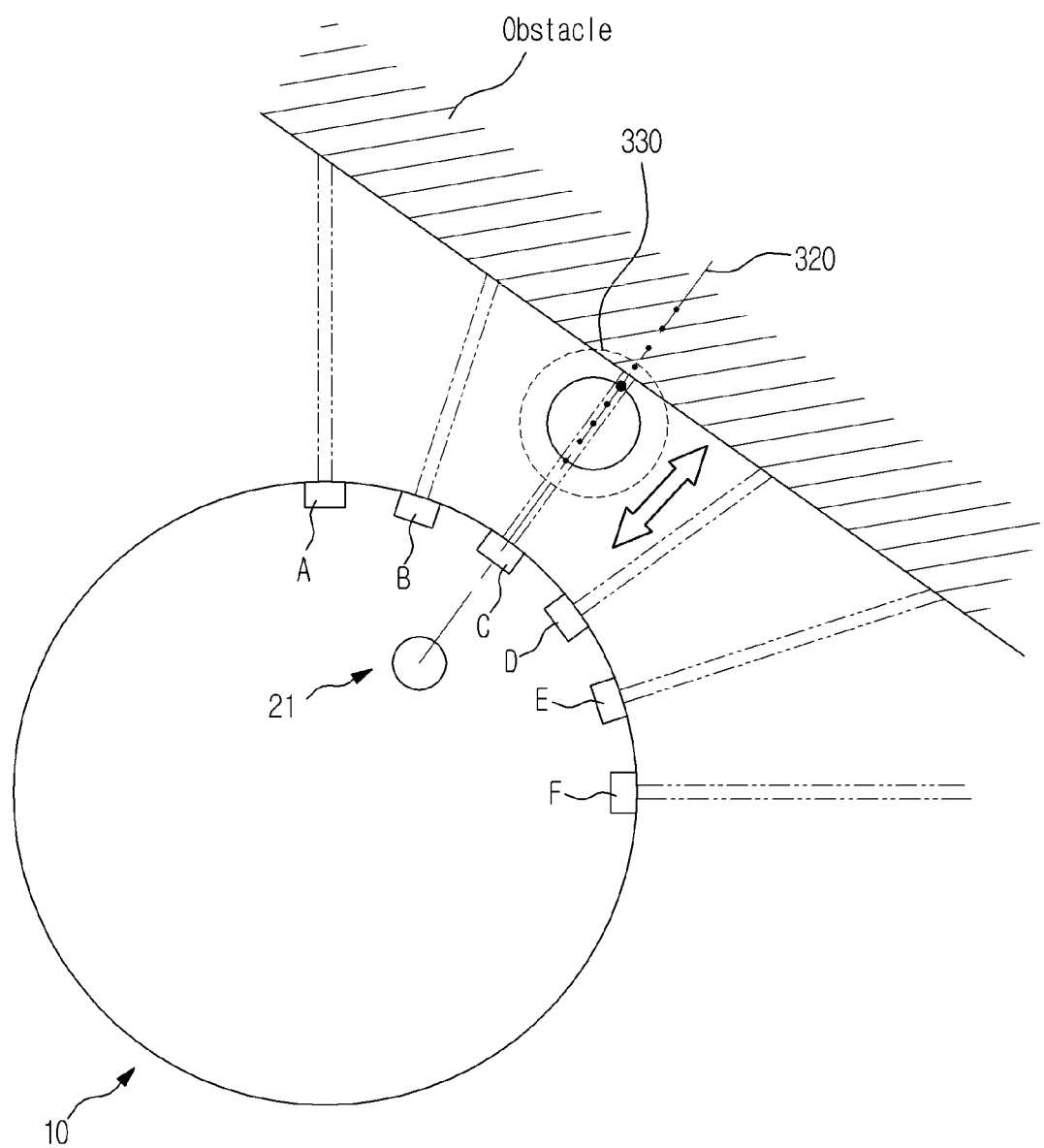
FIG. 14 is a view schematically illustrating operation of the robot cleaner according to the embodiment of FIG. 13.

FIG. 13 is a flowchart schematically illustrating a method for controlling the robot cleaner in accordance with another embodiment of the present disclosure. FIG. 14 is a view schematically illustrating operation of the robot cleaner according to the embodiment of FIG. 13. For convenience of description, this method will be described in conjunction with the embodiment of FIG. 4.

Referring to FIGS. 13 and 14, the obstacle sensing unit 220 senses an obstacle approaching the body 10 (610).

Figure 15:
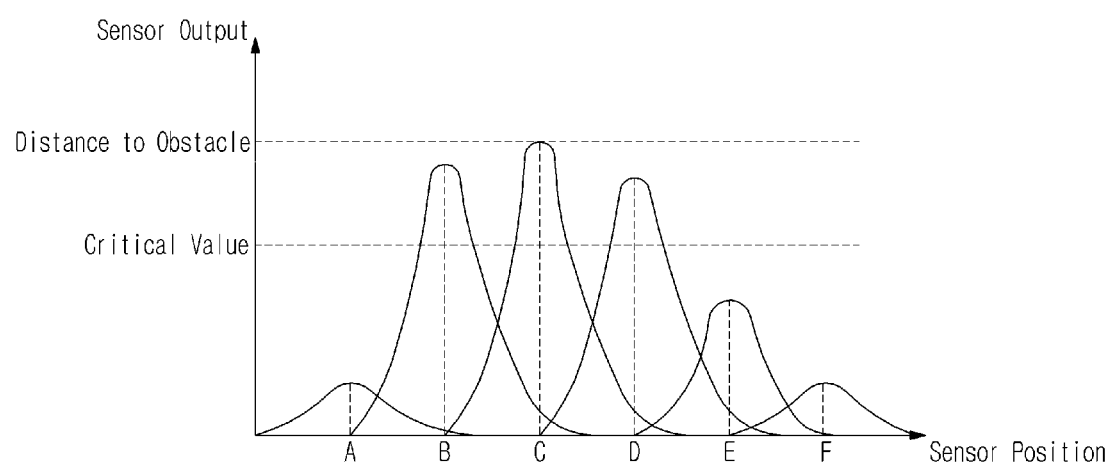
FIG. 15 is a graph schematically depicting obstacle sensing results of the robot cleaner according to the embodiment of FIG. 13.

Thereafter, the cleaning controller 241 analyzes results of obstacle sensing in accordance with positions of the proximity sensors 61 (620). Through analysis of the obstacle sensing results, it may be seen that output signals from the proximity sensors 61 exhibit different intensities in accordance with different sensing directions of the proximity sensors 61, as shown in FIG. 15. For example, when an obstacle is disposed in an extension direction of the auxiliary cleaning unit 21, output signals from the proximity sensors 61 exhibit higher intensities in the arrangement order of the proximity sensors 61 nearer to the auxiliary cleaning unit 21. In the illustrated case, it may be possible to analyze the results of obstacle sensing, taking into consideration only the output signal from the proximity sensor 61 disposed in the extension direction of the auxiliary cleaning unit 21. Also, it may be possible to calculate the distance to the obstacle, based on an output signal from the proximity sensor 61 disposed at a sensor position B, C or D.

The cleaning controller 241 analyzes whether the output signal from each proximity sensor 61 is higher or lower than a predetermined critical value. Here, the critical value corresponds to the distance from the body 10 to the outermost portion of the auxiliary cleaning unit 21 in the extension direction of the extension arm 107.

Subsequently, the cleaning controller 241 determines an extension position of the auxiliary cleaning unit 21, based on the results of analysis (630). The auxiliary cleaning unit 21 may extend to the extension position along an extension path 340 of the extension arm 107. The extension position of the auxiliary cleaning unit 21 corresponds to a position on the extension path 340 of the extension arm 107.

When the output signal from the proximity sensor 61 is higher than the predetermined critical value, the cleaning controller 241 may determine that, in association with the position of the proximity sensor 61, there is an insufficient space to allow the auxiliary cleaning unit 21 to extend. In this case, from among the proximity sensors 61, each of which outputs a signal lower than the critical value, one proximity sensor 61 outputting a signal having highest intensity is selected. After determining the position of the selected proximity sensor 61, the cleaning controller 241 determines an extension position of the auxiliary cleaning unit 21, based on the determined position of the proximity sensor 61. In the illustrated case, an extension position of the auxiliary cleaning unit 21 may be determined, based on an output signal from the proximity sensor 61 disposed at a sensor position B or D.

On the other hand, when the output signal from the proximity sensor 61 is lower than the predetermined critical value, the cleaning controller 241 may determine that, in association with the position of the proximity sensor 61, there is a sufficient space to allow the auxiliary cleaning unit 21 to extend. In this case, the cleaning controller 241 determines the position of the proximity sensor 61, and then determines an extension position of the auxiliary cleaning unit 21, based on the determined position of the proximity sensor 61. In this case, it may be possible to extend the auxiliary cleaning unit 21 to a maximum extension position thereof.

Thereafter, the cleaning controller 241 adjusts an extension distance of the side arm 102, based on the determined extension position, to cause the auxiliary cleaning unit 21 to extend to the determined extension position (640).

Although adjustment of the extension distance of the auxiliary cleaning unit 21 upon controlling the auxiliary cleaning unit 21 has been described as being carried out on the basis of the travel direction of the body 10, the adjustment may be carried out in the same manner as the above-described cases, for an obstacle disposed in a direction other than the above-described directions of the body 10.

Also, although the above description has been given in conjunction with, for example, the right auxiliary cleaning unit 21, for convenience of description, the same adjustment as described above may be carried out in conjunction with the left auxiliary cleaning unit 22.

Also, control of retraction of the auxiliary cleaning units 21 and 22 may be carried out in a reverse manner to that of the above-described control of extension of the auxiliary cleaning units 21 and 22.

Figure 16:
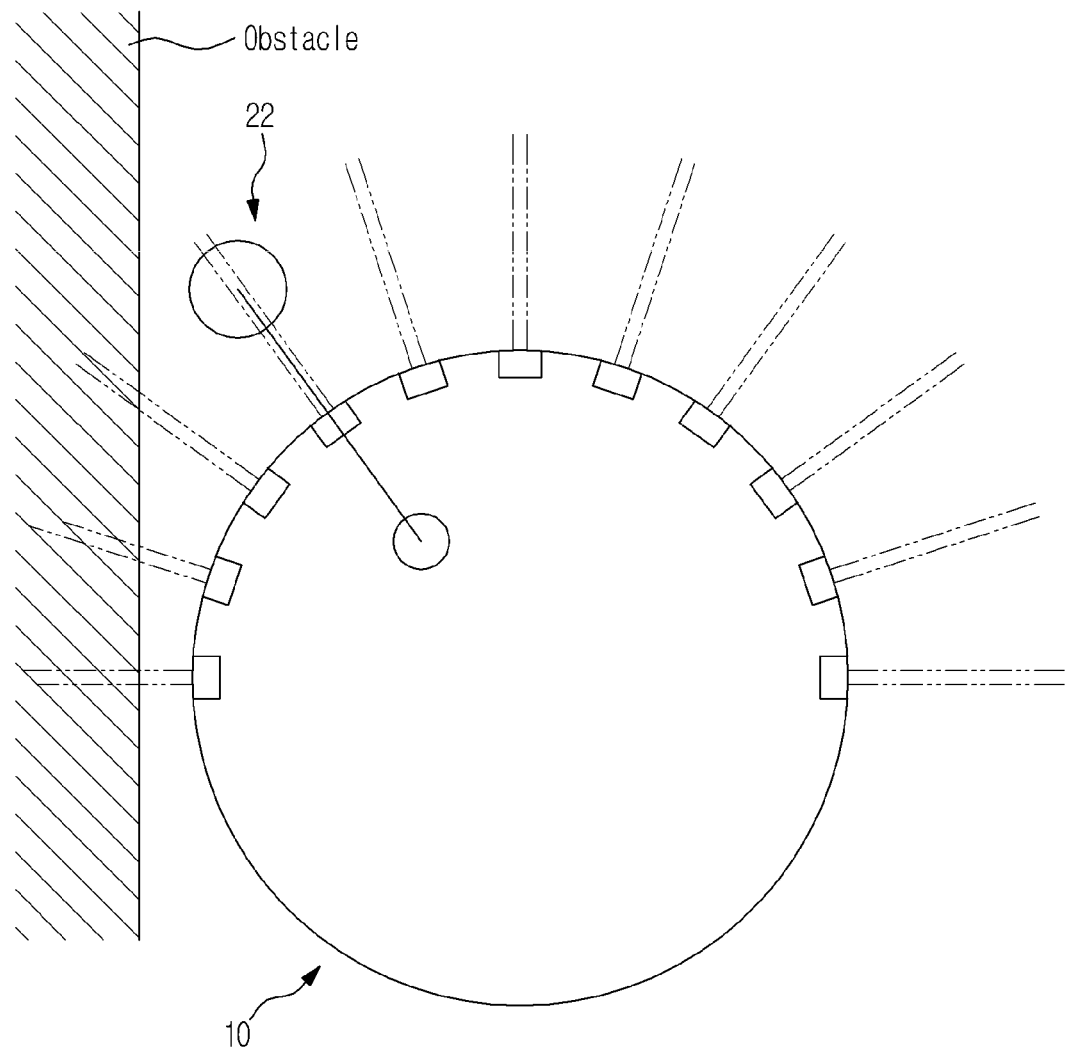
FIGS. 16 to 18 are views schematically illustrating operation of the robot cleaner according to another embodiment of the present disclosure.
Figure 17:
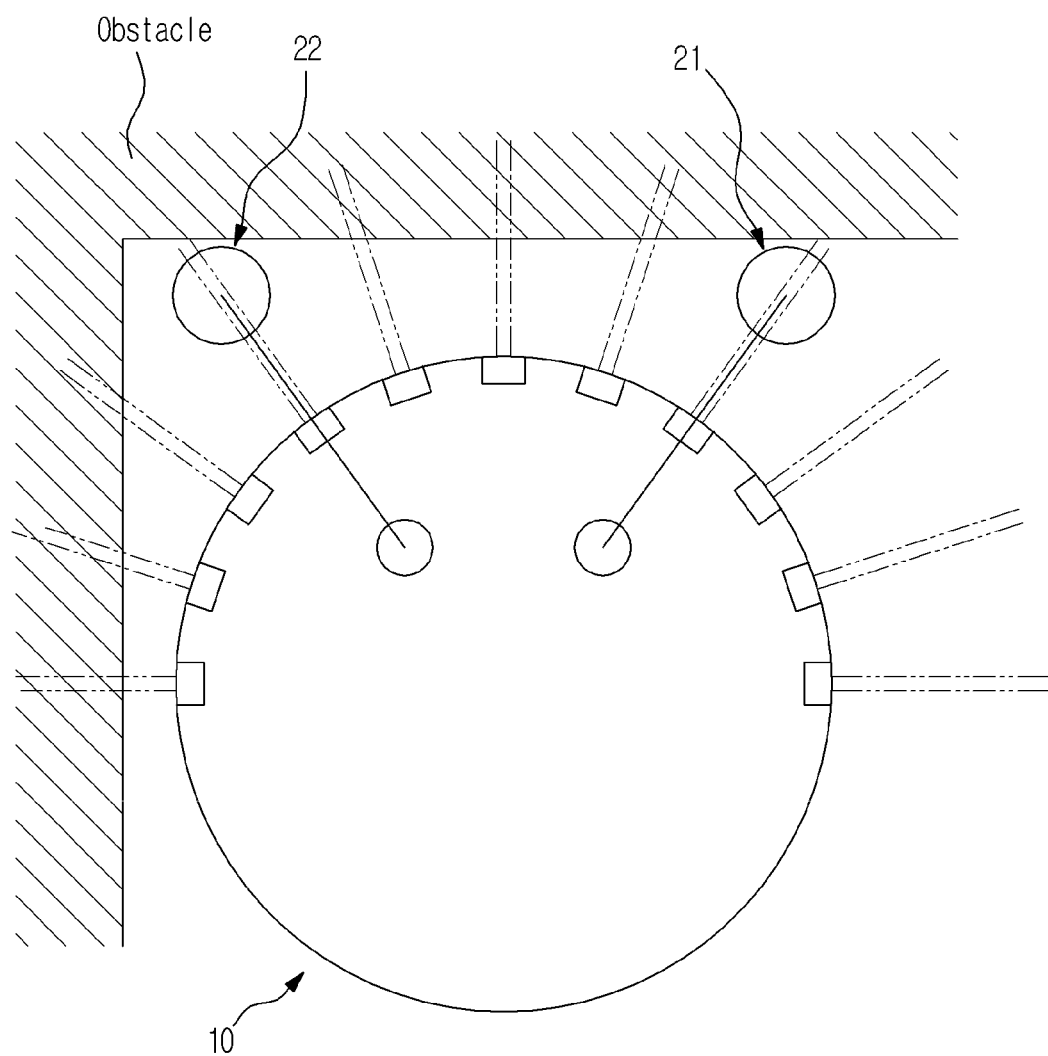
Figure 18:
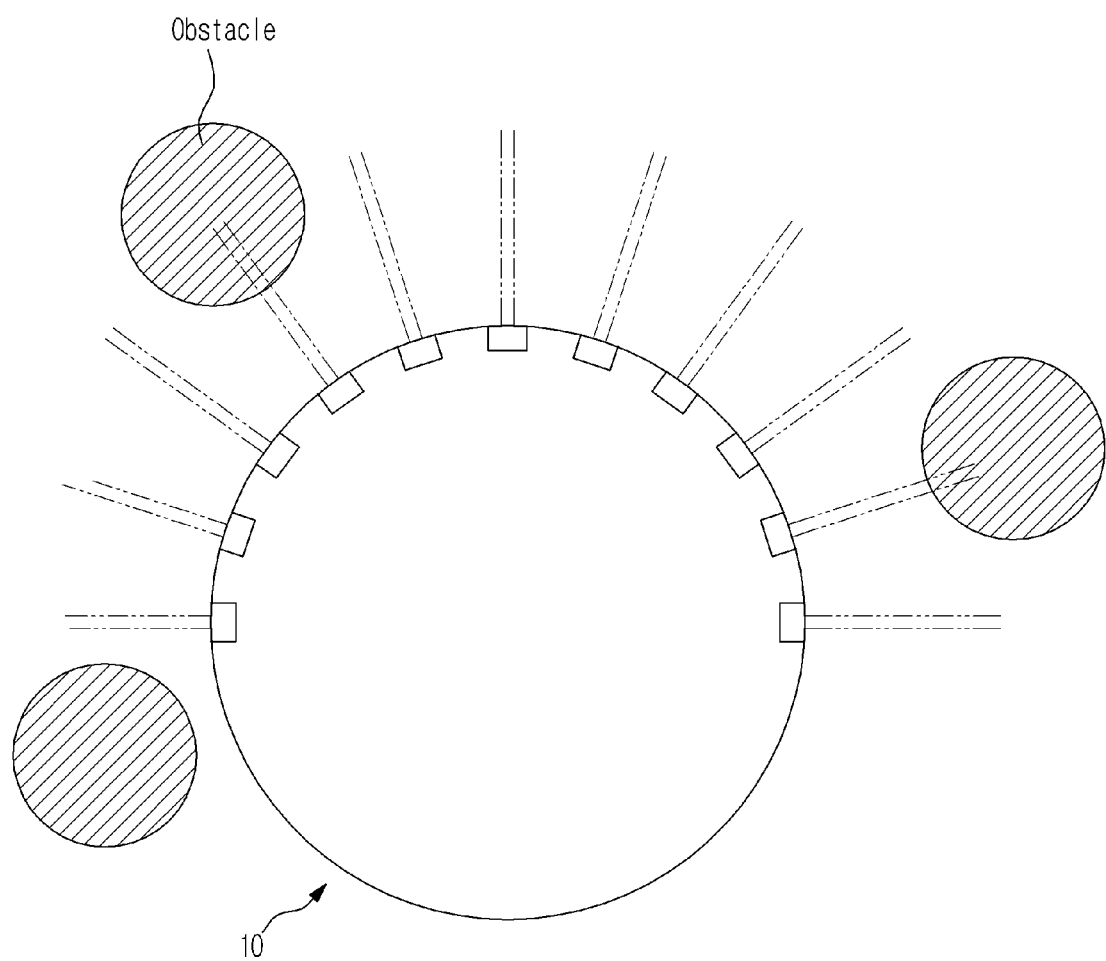

FIGS. 16 to 18 are views schematically illustrating operation of the robot cleaner according to another embodiment of the present disclosure.

Referring to FIGS. 16 to 18, the cleaning controller 241 determines the shape of an obstacle, and controls extension or retraction of each auxiliary cleaning unit 21 or 22, based on the determined shape of the obstacle.

When proximity sensors 61, which are provided in plural while being disposed around the body 10, output higher-intensity signals in the arrangement order of the proximity sensors 61 nearer to one lateral side of the body 10, it may be determined that there is an obstacle in the form of a flat wall at the lateral side of the body 10. In this case, for the sensed obstacle, the cleaning controller 241 controls the auxiliary cleaning unit 21 or 22 such that the auxiliary cleaning unit 21 or 22 is retracted after being maintained in an extended state for a predetermined time. Alternatively, the cleaning controller 241 may control the auxiliary cleaning unit 21 or 22 such that the auxiliary cleaning unit 21 or 22 is extended after being maintained in a retracted state for a predetermined time.

The cleaning controller 241 independently controls the left auxiliary cleaning unit 22 and the right auxiliary cleaning unit 21 such that they are independently extended or retracted. In this case, when an obstacle is disposed only at the left or right of the body 10, the cleaning controller 241 performs a control operation such that only the left or right auxiliary cleaning unit 22 or 21 is extended or retracted. Alternatively, the cleaning controller 241 may perform a control operation such that both auxiliary cleaning units 21 and 22 are simultaneously extended or retracted.

On the other hand, even when there are three or more auxiliary cleaning units, the cleaning controller 241 may control the auxiliary cleaning units in the same manner as described above.

When output signals from a certain number of proximity sensors 61 have values gradually increasing from a predetermined value in the arrangement order of the proximity sensors 61 nearer to one lateral side of the body 10, and output signals from a certain number of proximity sensors 61 have values gradually increasing from a predetermined value in the arrangement order of the proximity sensors 61 nearer to the front of the body 10, the cleaning controller 241 may determine that there are obstacles in the form of walls at the lateral side and front side of the body 10, respectively, that is, there is an obstacle in the form of a corner wall. For the corner wall obstacle, the cleaning controller 241 controls the auxiliary cleaning units 21 and 22 to be retracted after being maintained in an extended state for a predetermined time. Also, the cleaning controller 241 controls the auxiliary cleaning units 21 and 22 to be extended after being maintained in a retracted state for a predetermined time.

When an obstacle is disposed at the front side of the body 10, the cleaning controller 241 controls the auxiliary cleaning units 21 and 22 to be simultaneously extended.

When the proximity sensors 61, output signals of which are higher than a predetermined value, do not output such higher signals in a continuous manner, the cleaning controller 241 may determine that there is an obstacle having a smaller size than a reference size around the body 10. For such an obstacle having a smaller size than the reference size, the cleaning controller 241 controls the auxiliary cleaning units 21 and 22 to be prevented from extending. The obstacle, which has a smaller size than a reference size, may be a flowerpot or a chair leg disposed on the floor, on which the body 10 travels. When the auxiliary cleaning units 21 and 22 extend in this case, they may strike the flowerpot, chair leg or the like or they may interfere with obstacle-bypassing travel of the body 10.

Figure 19:
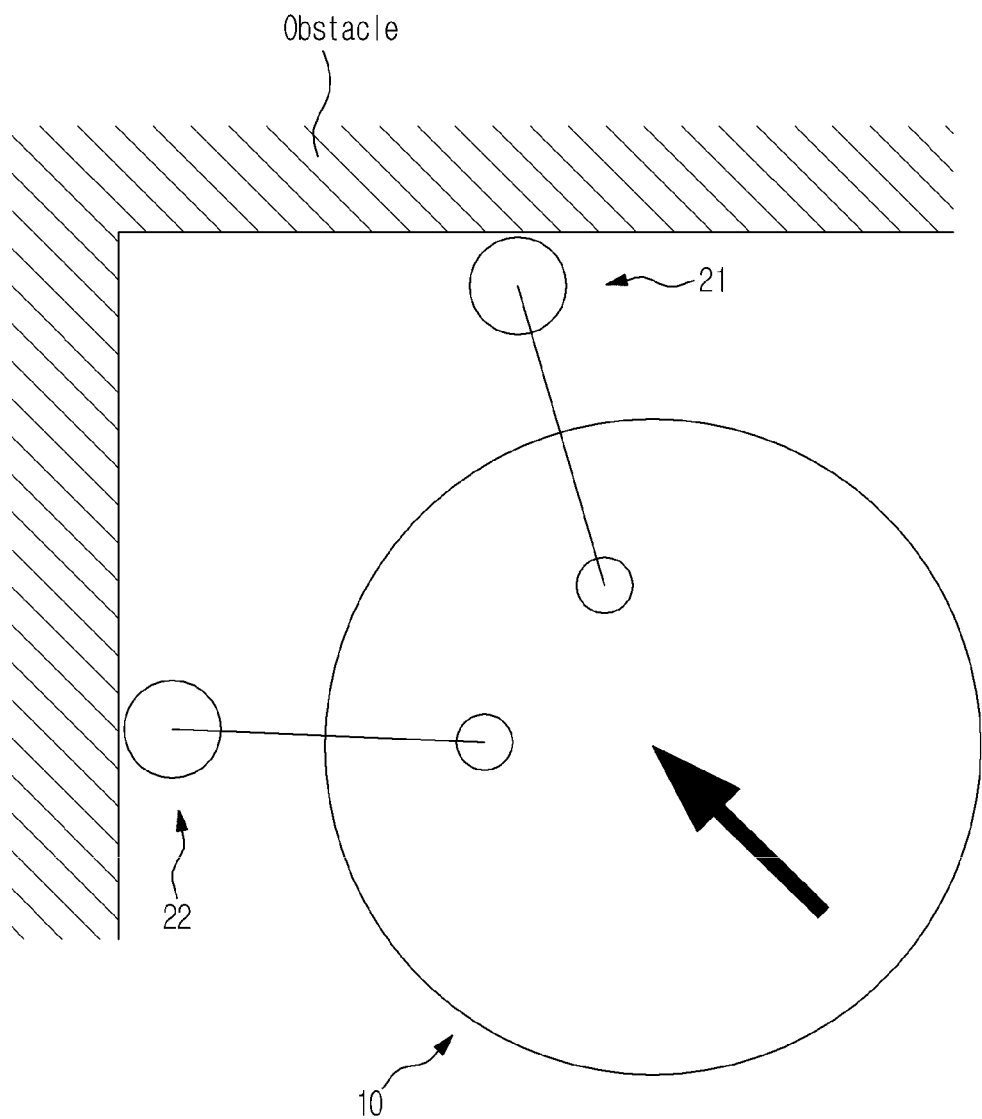
FIGS. 19 to 21 are views schematically illustrating operation of the robot cleaner according to another embodiment of the present disclosure.
Figure 20:
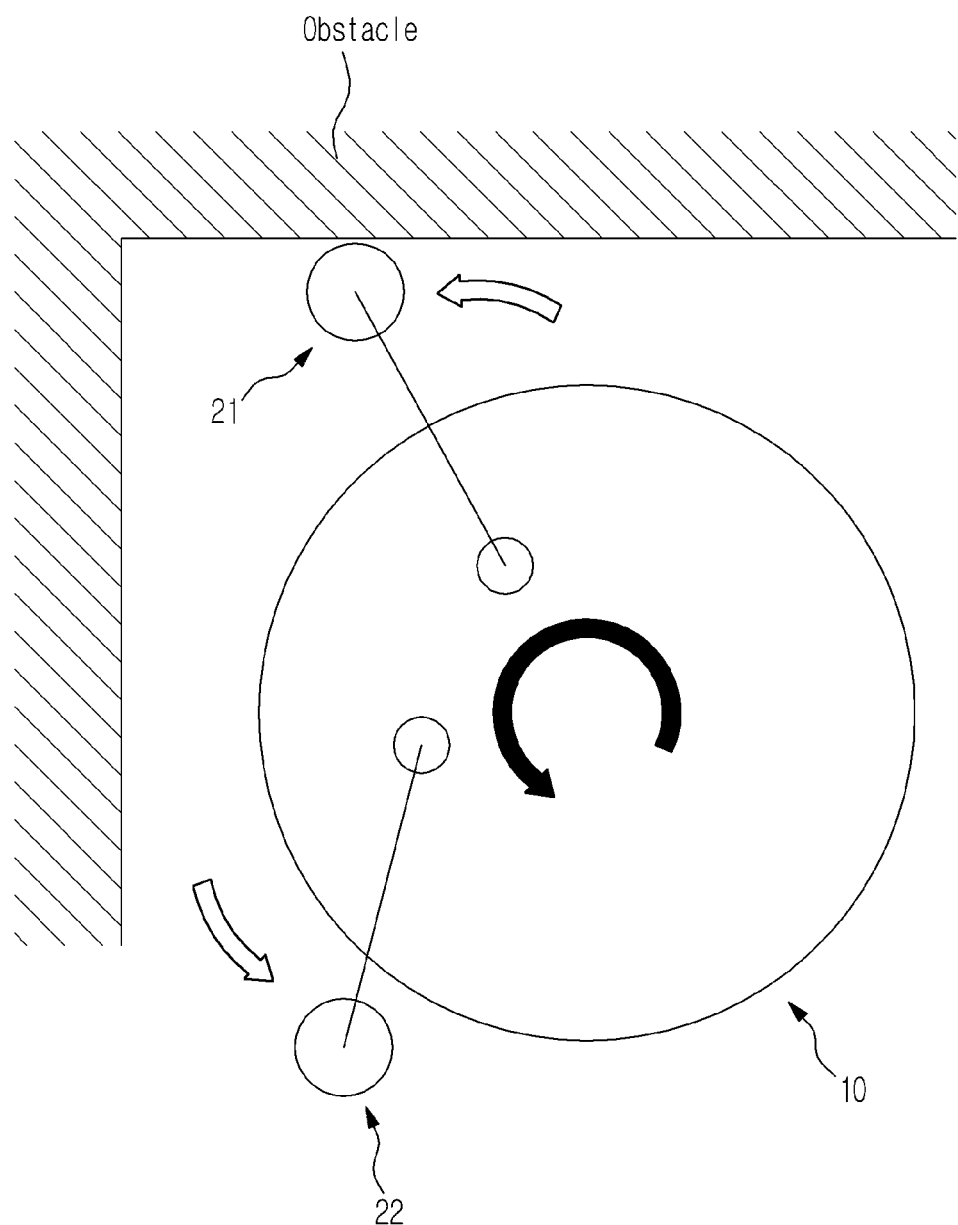
Figure 21:
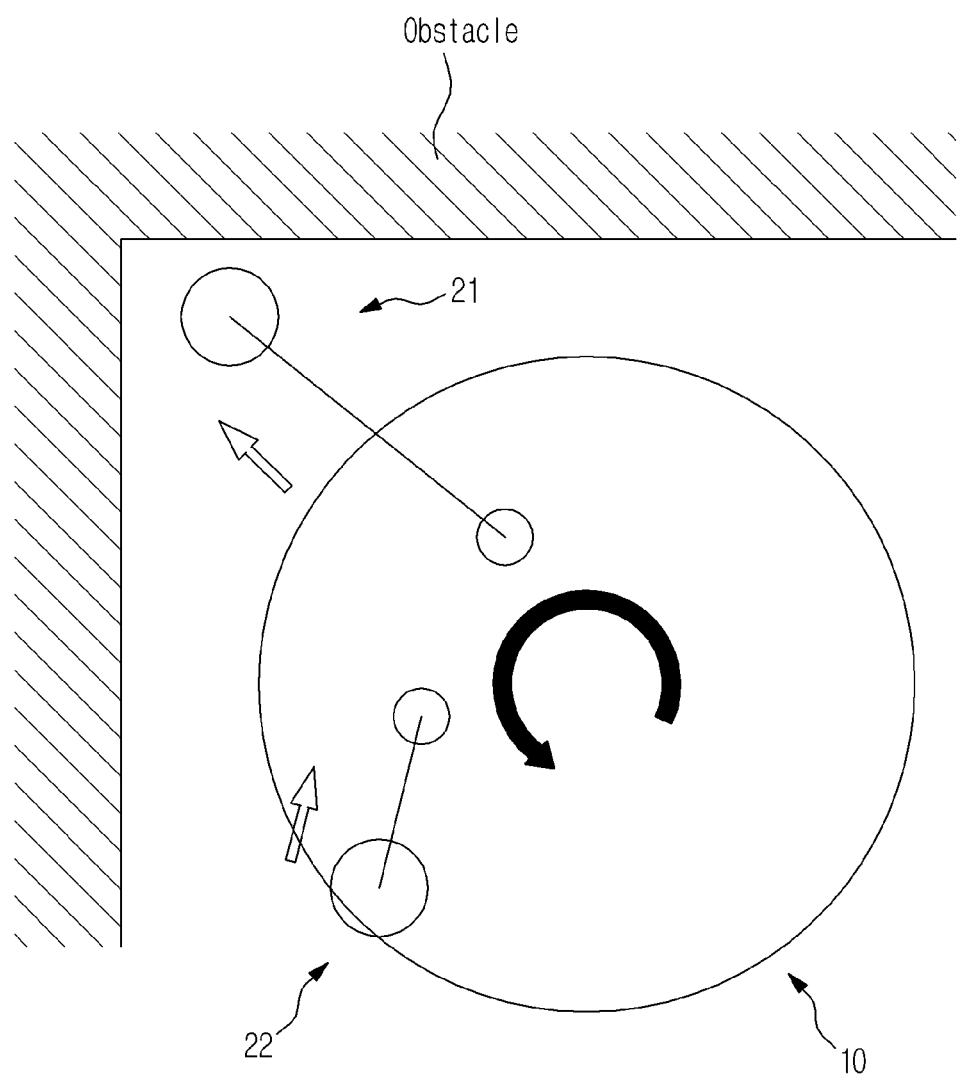

FIGS. 19 to 21 are views schematically illustrating operation of the robot cleaner according to another embodiment of the present disclosure.

Referring to FIGS. 19 to 21, the cleaning controller 241 controls extension or retraction of the auxiliary cleaning units 21 and 22 in accordance with a travel direction of the body 10.

When the body 10 approaches an obstacle in the form of a corner wall, the cleaning controller 241 controls the auxiliary cleaning units 21 and 22 to be simultaneously extended. In this case, the travel controller 242 controls the drive wheels 41 and 42 such that the body 10 rotates in place or moves backward, to bypass the obstacle.

In this case, the cleaning controller 241 may control the auxiliary cleaning units 21 and 22 to be retracted before the rotation or backward movement of the body 10. Also, the cleaning controller 241 may control the auxiliary cleaning units 21 and 22 such that a preceding one of the auxiliary cleaning units 21 and 22 in a rotation direction of the body 10 is retracted before or after rotation of the body 10 in accordance with the rotation direction of the body 10. Alternatively, the cleaning controller 241 may control the auxiliary cleaning units 21 and 22 such that a following one of the auxiliary cleaning units 21 and 22 in the rotation direction of the body 10 is retracted before or after rotation of the body 10 in accordance with the rotation direction of the body 10.

Also, the cleaning controller 241 may control the auxiliary cleaning units 21 and 22 such that the auxiliary cleaning units 21 and 22 extend by different distances in accordance with a rotation direction of the body 10. For example, when the body 10 rotates in a counterclockwise direction, the cleaning controller 241 may control the auxiliary cleaning units 21 and 22 such that the extension distance of the left auxiliary cleaning unit 22 is reduced, and the extension distance of the right auxiliary cleaning unit 21 is increased.

Thus, when the body 10 travels while bypassing an obstacle in the form of a corner wall, it is possible to prevent the auxiliary cleaning units 21 and 22 from striking the obstacle.

Even when there is a step on a bypass travel path of the body 10, the same effect as in the above case may be obtained. In particular, even when the step is not disposed on a travel path of the body 10, there may be a possibility that the auxiliary cleaning units 21 and 22 strike the step. In this case, accordingly, a preceding one of the auxiliary cleaning units 21 and 22 in a rotation direction of the body 10, for example, the auxiliary cleaning unit 22, is controlled to be previously retracted. In this case, in order to allow the auxiliary cleaning unit 21 following the auxiliary cleaning unit 22 in the rotation direction of the body 10 to be naturally retracted, electric power supplied to the arm motor of the auxiliary cleaning unit 21 may be reduced. Alternatively, spring structures may be employed for respective auxiliary cleaning units 21 and 22.

Meanwhile, when the body 10 performs bypass travel to bypass an obstacle in the form of a corner wall, the travel controller 242 may perform a control operation to reduce the travel speed of the body 10 while increasing the rotation speed of the auxiliary cleaning tool 110. When the travel speed of the body 10 is reduced, the cleaning time for a corner wall is increased. When the rotation speed of the auxiliary cleaning tool 110 is increased, the number of times to sweep dust at a corner wall area is increased. Accordingly, there is an effect of enhancing cleaning efficiency for a corner wall area.

Figure 22:
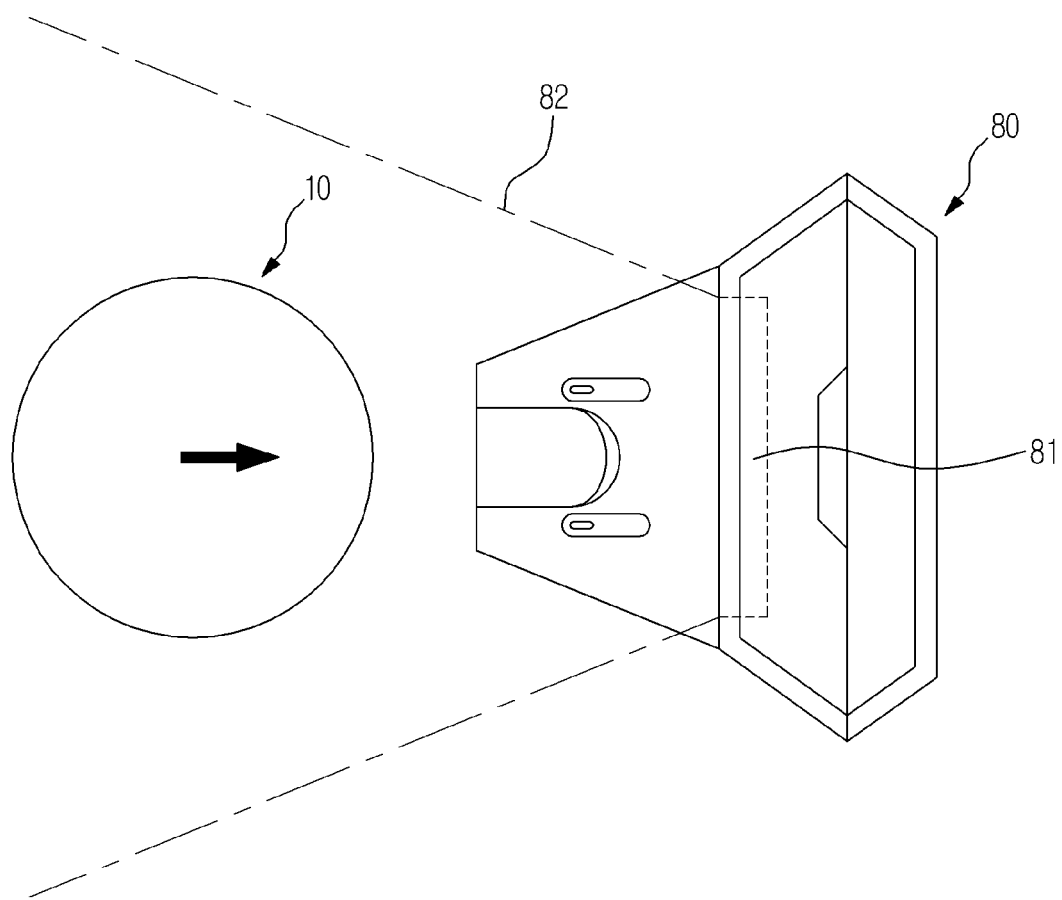
FIGS. 22 to 24 are views schematically illustrating operation of the robot cleaner according to another embodiment of the present disclosure.
Figure 23:
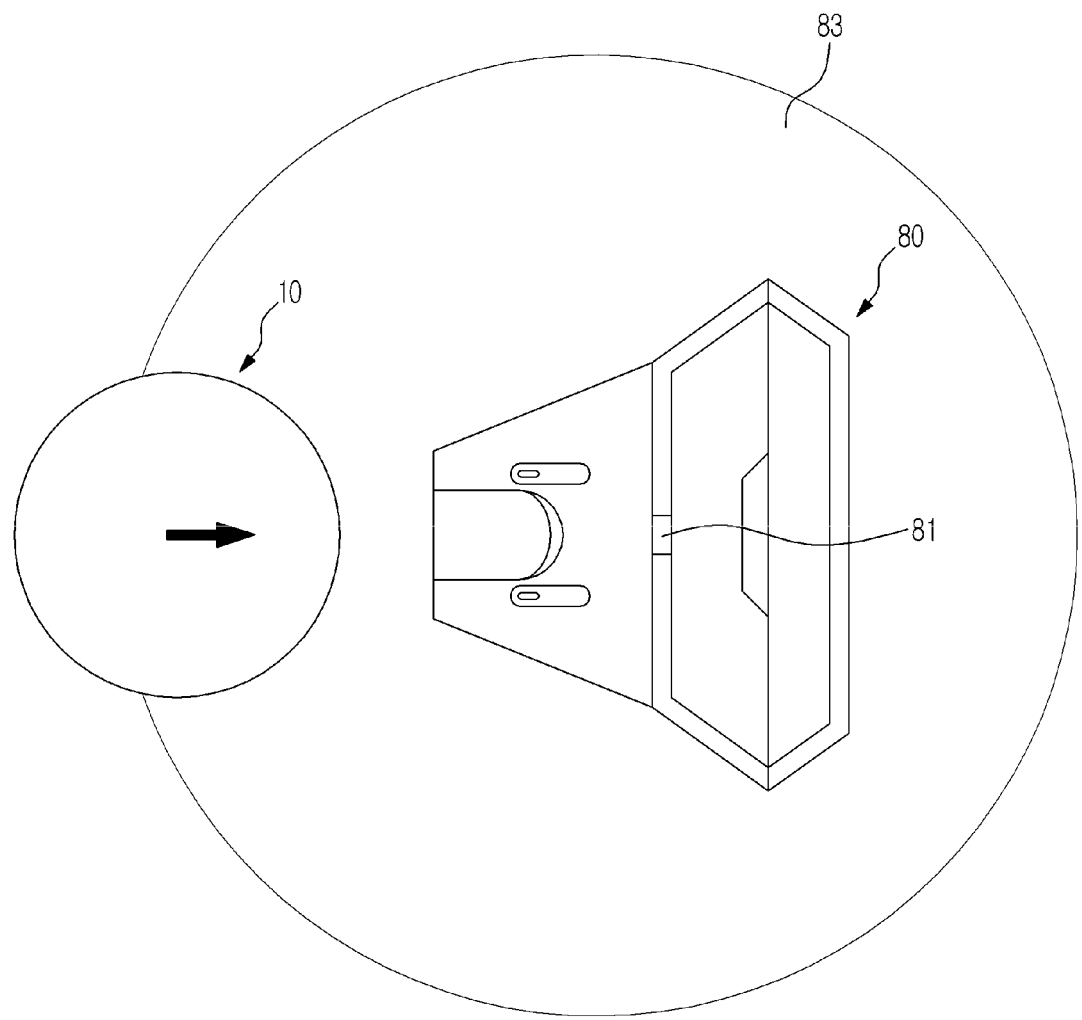
Figure 24:
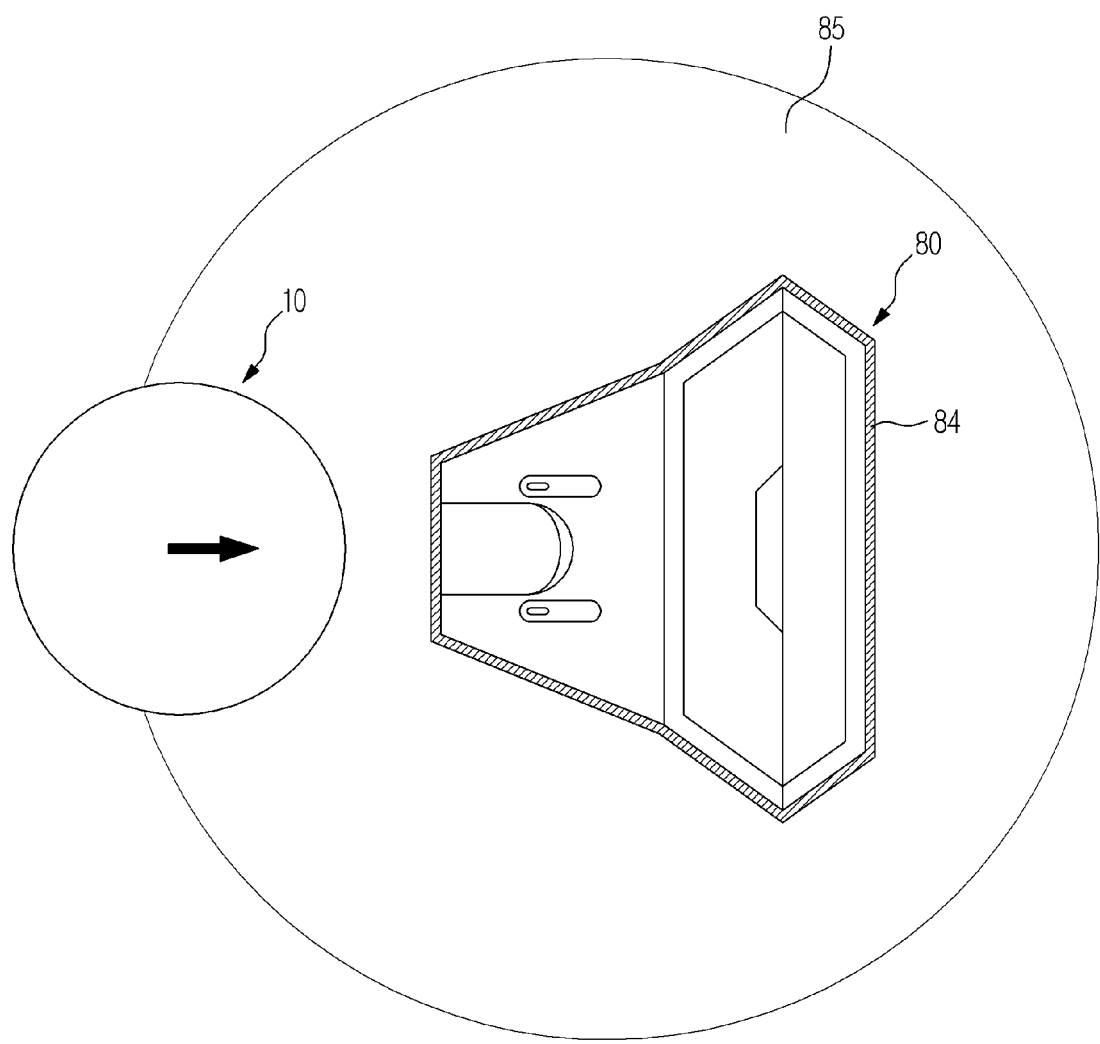

FIGS. 22 to 24 are views schematically illustrating operation of the robot cleaner according to another embodiment of the present disclosure.

Referring to FIGS. 22 to 24, the cleaning controller 241 controls extension or retraction of the auxiliary cleaning units 21 and 22 in accordance with a cleaning mode of the body 10.

In an automatic cleaning mode, when an obstacle approaching the body 10 is sensed, the cleaning controller 241 performs a control operation to extend the auxiliary cleaning units 21 and 22. When the robot cleaner 1 starts a cleaning operation in accordance with the automatic cleaning mode, the cleaning controller 241 also performs a control operation to prevent the auxiliary cleaning units 21 and 22 from extending for a predetermined time.

In a return mode, the charging controller 243 performs a control operation to return the body 10 to the charger 80. The cleaning controller 241 performs a control operation to prevent the auxiliary cleaning units 21 and 22 from extending while the body 10 returns to the charger 80. Alternatively, the cleaning controller 241 may perform a control operation to prevent the auxiliary cleaning units 21 and 22 from extending when it is determined that an obstacle sensed while the body 10 returns to the charger 80 in the return mode is the charger 10.

When the robot cleaner 1 travels to return to the charger 80 after completing cleaning, it is unnecessary to extend the auxiliary cleaning units 21 and 22, for cleaning. When the auxiliary cleaning units 21 and 22 are in an extended state, they may interfere with docking of the body 10 with the charger 80.

Meanwhile, a signal transmitter 81 to transmit a discriminating signal is installed at the charger 80 in order to enable the cleaning controller 241 to discriminate the charger 80 from obstacles.

The discriminating signal may be an infrared signal 82 transmitted from the signal transmitter 81 to enable the robot cleaner 1 to trace the position of the charger 80 or to dock with the charger 80, as shown in FIG. 22. In this case, the infrared signal 82 may be transmitted from the charger 80 in a radial manner or in a straight manner. When the infrared signal 82 is transmitted from the charger 80 in a radial manner, it may be divided into a low-power signal and a high-power signal, to form two different signal zones. For example, the low-power signal may form a signal zone enabling tracing of the position of the charger 80, and the high-power signal may form a signal zone enabling docking with the charger 80 during tracing of the position of the charger 80.

The signal sensing unit 230 senses the infrared signal 82 transmitted from the charger 80. When the infrared signal 82 is sensed, the cleaning controller 241 determines that the charger 80 is disposed in front of the body 10, and then performs a control operation to prevent the auxiliary cleaning units 21 and 22 from extending until the body 10 docks with the charger 80.

Alternatively, the discriminating signal may be a short-range radio frequency (RF) signal transmitted from the charger 80. In this case, as shown in FIG. 23, an RF signal zone 83 is formed around the charger 80. When the body 10 enters the RF signal zone 83, the signal sensing unit 230 may sense the short-range RF signal transmitted from the charger 80. Upon sensing the short-range RF signal, the cleaning controller 241 determines that the charger 80 is disposed around the body 10, and then performs a control operation to prevent the auxiliary cleaning units 21 and 22 from extending until the body 10 docks with the charger 80.

Also, the discriminating signal may be a magnetic field signal formed around the charger 80. For example, when a magnetic belt 84 is installed at the charger 80 such that it surrounds a front surface, lateral surfaces, overall surface or one surface of the charger 80, a magnetic field zone 85 may be formed around the charger 80 by the magnetic belt 84. Of course, the magnetic belt 84 may have a shape other than a belt shape.

The signal sensing unit 230 senses the magnetic field formed around the charger 80. When the magnetic field is sensed, the cleaning controller 241 determined that the charger 80 is disposed around the body 10, and then performs a control operation to prevent the auxiliary cleaning units 21 and 22 from extending until the body 10 docks with the charger 80.

The cleaning controller 241 also performs the control operation to prevent the auxiliary cleaning units 21 and 22 from extending in a charging mode, in which the body 10 performs a charging operation, in a charging completion mode, in which the charging operation of the body 10 is completed, and the charging stop mode, in which supply of electric power to the charger 80 is stopped during the charging operation of the body 10.

The above-described operations of the robot cleaner 1 may be applied to the exhaust station to exhaust dust collected in the robot cleaner 1 in the same manner as applied to the charger 80.

Meanwhile, although the auxiliary cleaning units 21 and 22 of the robot cleaner 1 have been described as being coupled to left and light sides of the body 10 in the above-described embodiments of the present disclosure, there is no limitation as to the number of auxiliary cleaning units and the installation positions of auxiliary cleaning units.

As apparent from the above description, in accordance with one aspect of the present disclosure, it may be possible to adjust an extension or retraction degree of each auxiliary cleaning unit when an obstacle is sensed. Accordingly, it may be possible to prevent the auxiliary cleaning unit from striking an obstacle, and to enhance cleaning efficiency for an area disposed adjacent to a wall, etc. In accordance with another aspect of the present disclosure, it may be possible to control extension or retraction of each auxiliary cleaning unit in accordance with the shape of an obstacle. Accordingly, in this case, it may be possible to reduce the cleaning time of the robot cleaner, and to further enhance cleaning efficiency for an area disposed adjacent to a wall, etc. In accordance with another aspect of the present disclosure, it may be possible to control extension or retraction of each auxiliary cleaning unit in accordance with a travel direction of the body of the robot cleaner. In this case, accordingly, the robot cleaner may travel without striking an obstacle even when it performs obstacle-bypassing travel. In accordance with another aspect of the present disclosure, it may be possible to control extension or retraction of each auxiliary cleaning unit in accordance with a cleaning mode. Accordingly, in this case, the robot cleaner may rapidly return to the charger or exhaust station. Also, the robot cleaner may determine the charger or exhaust station as an obstacle, thereby preventing the auxiliary cleaning unit from striking the charger or exhaust station.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A robot cleaner comprising:
    a body to travel on a floor and including an outer surface;
    a proximity sensor to sense an obstacle and output an output signal;
    an auxiliary cleaning unit including a side arm pivotably mounted to a bottom of the body, wherein the side arm of the auxiliary cleaning unit is configured to be extendable from the body by pivoting in a first direction and retractable toward the body by pivoting in a second direction, and the side arm is configured to be positioned inside of the outer surface of the body when the side arm is in a fully retracted position; and
    a control unit to:
        determine a distance from a pivot shaft of the side arm of the auxiliary cleaning unit to the obstacle based on the output signal of the proximity sensor when the obstacle is sensed,
        determine a pivot angle of the side arm of the auxiliary cleaning unit, along which the side arm of the auxiliary cleaning unit pivots in the first direction, based on the determined distance, and
        control the auxiliary cleaning unit to pivot the side arm by the determined pivot angle.

2. The robot cleaner according to claim 1, wherein the control units determines whether the output signal output by the proximity sensor is greater than a predetermined critical value or not.

3. The robot cleaner according to claim 1, wherein the control units controls the pivot angle of the side arm of the auxiliary cleaning unit based on a position of the side arm of the auxiliary cleaning unit such that the side arm of the auxiliary cleaning unit is extended when the output signal output by the proximity sensor is greater than a predetermined critical value.

4. The robot cleaner according to claim 1, wherein the control unit controls the pivot angle of the side arm of the auxiliary cleaning unit, based on the output signal from the proximity sensor depending on an extension direction of the side arm of the auxiliary cleaning unit.

5. The robot cleaner according to claim 1, wherein the control unit controls the pivot angle of the side arm of the auxiliary cleaning unit such that the side arm of the auxiliary cleaning unit is extended in proportion to the output signal.

6. The robot cleaner according to claim 1, wherein the control unit controls extension or retraction of the side arm of the auxiliary cleaning unit by controlling the pivot angle of the side arm of the auxiliary cleaning unit.

* * * * *